(12) United States Patent  (10) Patent No.: US 7,667,600 B2
Woodbury et al.  (45) Date of Patent: Feb. 23, 2010

(54) METHODS AND APPARATUS FOR SECURITY DEVICE REMOVAL DETECTION

(75) Inventors: Brian Woodbury, Gilbert, AZ (US); John Spenik, Phoenix, AZ (US); Roc Lastinger, Cave Creek, AZ (US)

(73) Assignee: Roc2Loc, Inc., San Francisco, CA (US)

( * ) Notice: Subject to any disclaimer, the term of this patent is extended or adjusted under 35 U.S.C. 154(b) by 152 days.

(21) Appl. No.: 11/955,665

(22) Filed: Dec. 13, 2007

(65) Prior Publication Data

US 2008/0143525 A1 Jun. 19, 2008

Related U.S. Application Data

(60) Provisional application No. 60/874,996, filed on Dec. 16, 2006, provisional application No. 60/897,785, filed on Jan. 26, 2007.

(51) Int. Cl.
 *G08B 13/14* (2006.01)
(52) U.S. Cl. .................. 340/568.1; 340/547; 340/545.1; 340/541; 340/551; 335/205; 335/207; 335/209; 335/215; 335/228
(58) Field of Classification Search .............. 340/567.1, 340/547, 541, 545.1, 551, 568.1; 335/205, 335/207, 209, 215, 228
See application file for complete search history.

(56) References Cited

U.S. PATENT DOCUMENTS

| 3,556,341 | A | 1/1971 | Rains |
| 4,541,771 | A | 9/1985 | Beni et al. |
| 4,720,128 | A | 1/1988 | Logan, Jr. et al. |
| 4,986,759 | A | 1/1991 | Duncan |
| 5,236,011 | A | 8/1993 | Casada et al. |
| 5,357,054 | A | 10/1994 | Beckerich |
| 5,880,659 | A | 3/1999 | Woods |
| 6,491,271 | B1 | 12/2002 | Adams |
| 6,497,035 | B1 | 12/2002 | Ratliff |
| 6,724,316 | B2 | 4/2004 | Addy et al. |
| 6,825,751 | B1 | 11/2004 | Kita et al. |
| 6,828,909 | B2 | 12/2004 | Script et al. |
| 7,049,914 | B2 | 5/2006 | Lamb et al. |

(Continued)

FOREIGN PATENT DOCUMENTS

EP 1076225 7/2000

(Continued)

*Primary Examiner*—Tai T Nguyen
(74) *Attorney, Agent, or Firm*—Letham Law Firm LLC; Lawrence Letham

(57) ABSTRACT

A security device, according to various aspects of the present invention, detects removal of the device from a provided surface. The security device includes a body; at least one magnet coupled to the body; and a sensor coupled to the body proximate to at least one of the at least one magnet. The sensor does not move with respect to the at least one magnet. The at least one magnet magnetically couples the body to the surface. Each one magnet provides a magnetic flux. When the body couples to the surface, at least a portion of the magnetic flux conducts away from the sensor. When the body is not coupled to the surface, at least a portion of the magnetic flux from at least one magnet of the at least one magnet conducts through the sensor thereby indicating removal of the body from the surface.

27 Claims, 17 Drawing Sheets

U.S. PATENT DOCUMENTS

| | | |
|---|---|---|
| 7,242,297 B2 | 7/2007 | Vogt |
| 7,287,738 B2 | 10/2007 | Pitlor |
| 2001/0007422 A1* | 7/2001 | Noe et al. .................. 324/209 |
| 2001/0020901 A1 | 9/2001 | McHugh et al. |
| 2001/0028246 A1 | 10/2001 | Aruga et al. |
| 2002/0149454 A1 | 10/2002 | Nishikawa |
| 2002/0183008 A1 | 12/2002 | Menard et al. |
| 2004/0189293 A1 | 9/2004 | Czipott et al. |
| 2004/0263329 A1 | 12/2004 | Cargonja et al. |
| 2005/0030179 A1* | 2/2005 | Script et al. ............. 340/545.1 |
| 2005/0134457 A1 | 6/2005 | Rajapakse et al. |
| 2005/0139739 A1 | 6/2005 | Hamerski |
| 2005/0283839 A1 | 12/2005 | Cowburn |
| 2007/0022663 A1 | 2/2007 | Faflek et al. |
| 2007/0069894 A1 | 3/2007 | Lee et al. |
| 2007/0139195 A1 | 6/2007 | Jin et al. |
| 2007/0154283 A1 | 7/2007 | Thurow et al. |
| 2007/0180890 A1 | 8/2007 | Steinich |
| 2007/0182226 A1 | 8/2007 | Sakuma et al. |
| 2007/0193319 A1 | 8/2007 | Huang et al. |
| 2007/0193401 A1 | 8/2007 | Campbell |
| 2007/0210927 A1 | 9/2007 | Domeier |
| 2008/0143523 A1 | 6/2008 | Ekstrom |

FOREIGN PATENT DOCUMENTS

| | | |
|---|---|---|
| EP | 1596166 | 4/2005 |

* cited by examiner

METHODS AND APPARATUS FOR SECURITY DEVICE REMOVAL DETECTION

CROSS-REFERENCE TO RELATED APPLICATIONS

This application claims benefit under 35 U.S.C. § 119(e) of U.S. Provisional Application No. 60/874,996 filed Dec. 16, 2006 herein incorporated by reference and U.S. Provisional Application No. 60/897,785 filed Jan. 26, 2007 herein incorporated by reference.

FIELD OF THE INVENTION

Embodiments of the present invention relate to apparatus for monitoring access to a secured area through a portal.

BACKGROUND OF THE INVENTION

Conventional security devices have been used to control access to a secured area. Access control includes detecting unauthorized ingress and/or egress; authenticating authorized users, providing reports of ingress and/or egress; and providing timely notice of unauthorized access. A security device that controls access to an area may benefit from fast, efficient deployment into the area and detection of tampering with the security device by an unauthorized person.

SUMMARY OF THE INVENTION

A security device, according to various aspects of the present invention, detects removal of the device from a provided surface. The security device includes a body; at least one magnet coupled to the body; and a sensor coupled to the body proximate to at least one of the at least one magnet. The sensor does not move with respect to the at least one magnet. The at least one magnet magnetically couples the body to the surface. Each one magnet provides a magnetic flux. When the body couples to the surface, at least a portion of the magnetic flux conducts away from the sensor. When the body is not coupled to the surface, at least a portion of the magnetic flux from at least one magnet of the at least one magnet conducts through the sensor thereby indicating removal of the body from the surface.

A removal detector, according to various aspects of the present invention, detects the removal of a provided security device from a provided surface. The removal detector includes at least one magnet and a sensor positioned proximate to at least one of the at least one magnet. The at least one magnet couples to the security device. The sensor couples to the security device. The sensor does not move with respect to the at least one magnet. The at least one magnet magnetically couples the removal detector to the surface. Each one magnet of the at least one magnet provides a magnetic flux. When the removal detector couples to the surface, at least a portion of the magnetic flux conducts away from the sensor. When the removal detector is not coupled to the surface, at least a portion of the magnetic flux from at least one magnet of the at least one magnet conducts through the sensor thereby indicating removal of the security device from the surface.

A security device, according to various aspects of the present invention, detects removal of the device from at least one of a first portal cover and a second portal cover. The security device includes a body; a first removal detector; and a second removal detector. The first removal detector magnetically couples the body to the first cover. The second removal detector magnetically couples the body to the second cover. The first removal detector detects removal of the body from the first cover. The second removal detector detects removal of the body from the second cover. At least one of the first removal detector and the second removal detector includes at least one magnet and a sensor positioned proximate to at least one of the at least one magnet. The sensor does not move with respect to the at least one magnet. Each one magnet provides a magnetic flux. When the security device couples to at least one of the first portal cover and the second portal cover, at least a portion of the magnetic flux conducts away from the sensor.

A method, according to the various aspects of the present invention, detects removal of the security device from a surface. The security device performs the method. The security device includes a body. The method includes, in any practical order, (1) detecting a change in a magnitude of a magnetic flux through a sensor; and (2) providing a signal in accordance with detecting. At least one magnet couples to the body of the security device. The sensor couples to the body proximate to at least one magnet of the at least one magnet. The sensor does not move with respect to the at least one magnet. Each one magnet provides a magnetic flux. The at least one magnet magnetically couples the body to the surface. When the body couples to the surface, at least a portion of the magnetic flux conducts away from the sensor. When the body is not coupled to the surface, at least a portion of the magnetic flux from at least one magnet of the at least one magnet conducts through the sensor.

BRIEF DESCRIPTION OF THE DRAWING

Embodiments of the present invention will now be further described with reference to the drawing, wherein like designations denote like elements, and.

DETAILED DESCRIPTION OF THE PREFERRED EMBODIMENTS

Figure 1:
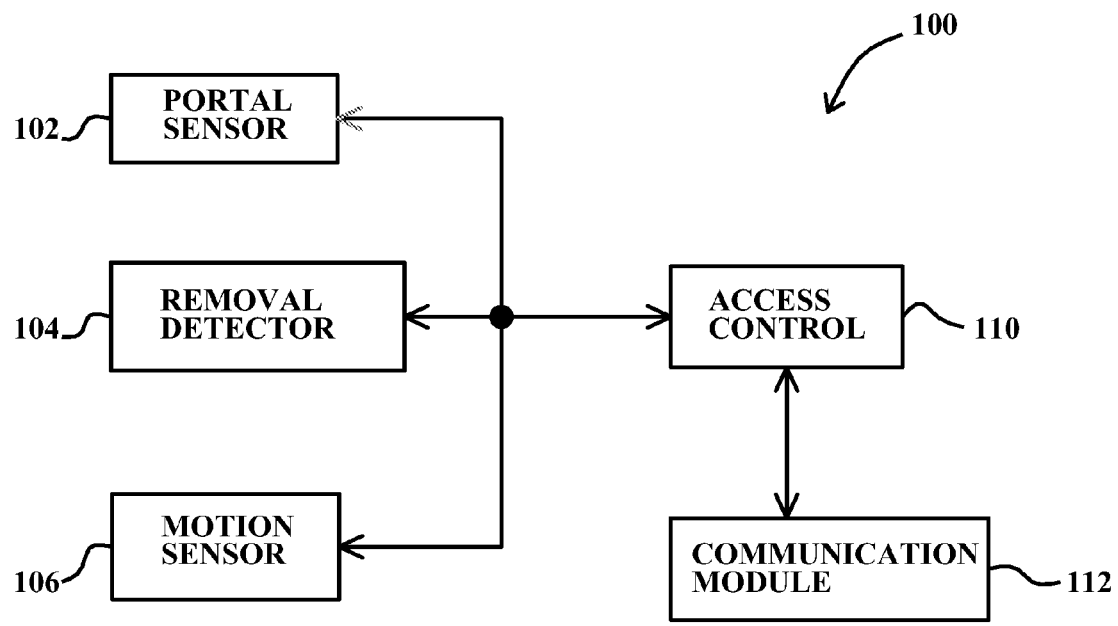
FIG. 1 is a functional block diagram of a security device according to various aspects of the present invention.
Figure 2:
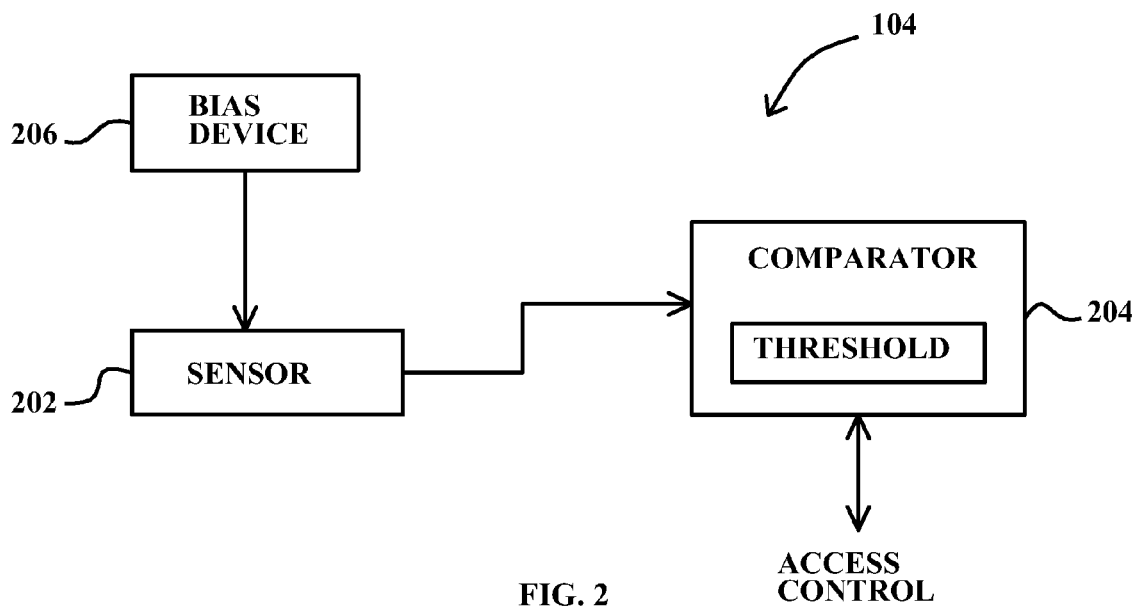
FIG. 2 is a functional block diagram of a removal detector according to various aspects of the present invention.
Figure 3:
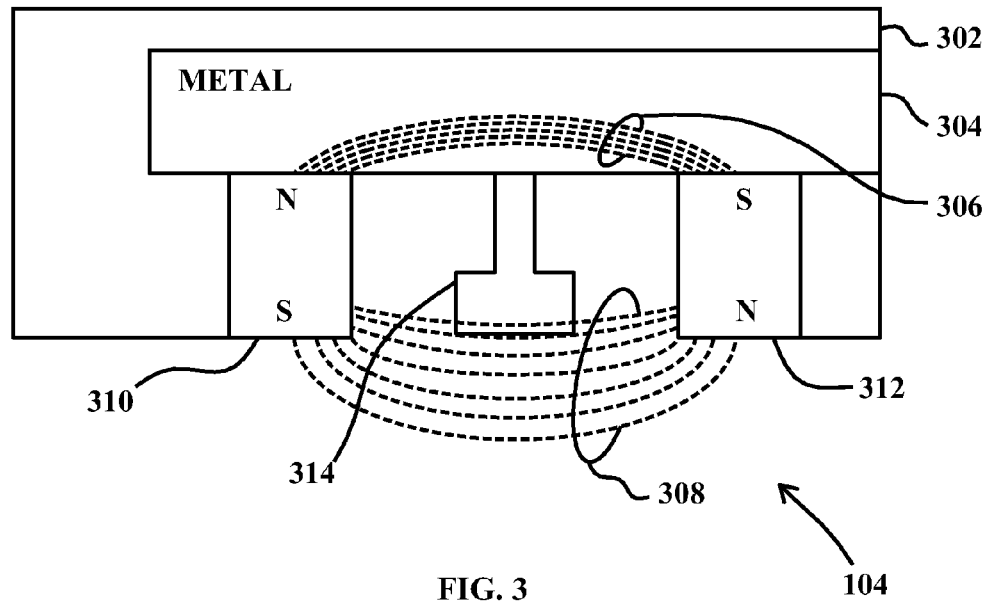
FIG. 3 a plan view of the security device of FIG. 1 having an implementation of the removal detector of FIG. 2 in a removed position.
Figure 4:
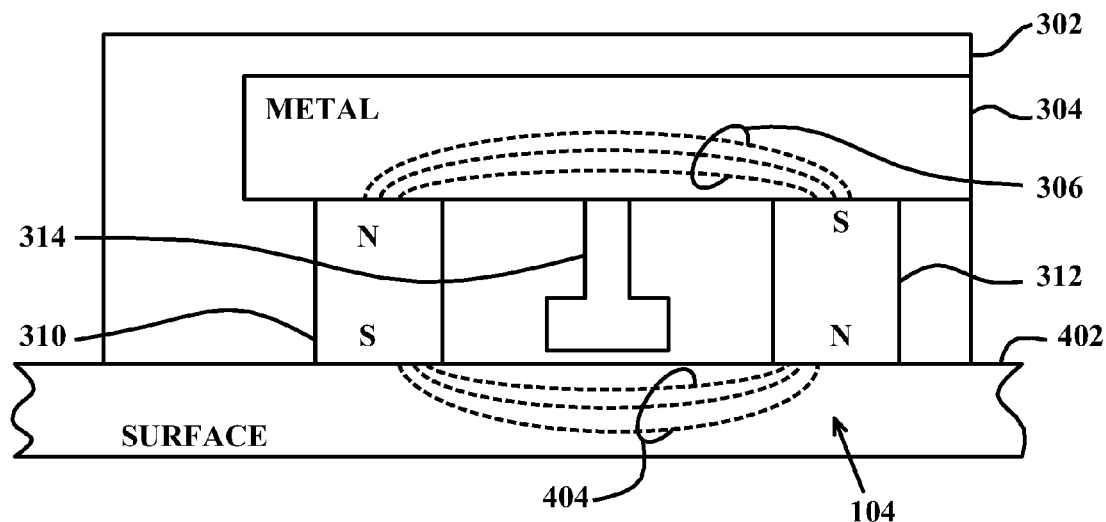
FIG. 4 a plan view of the security device of FIG. 1 having an implementation of the removal detector of FIG. 2 in a coupled position.
Figure 5:
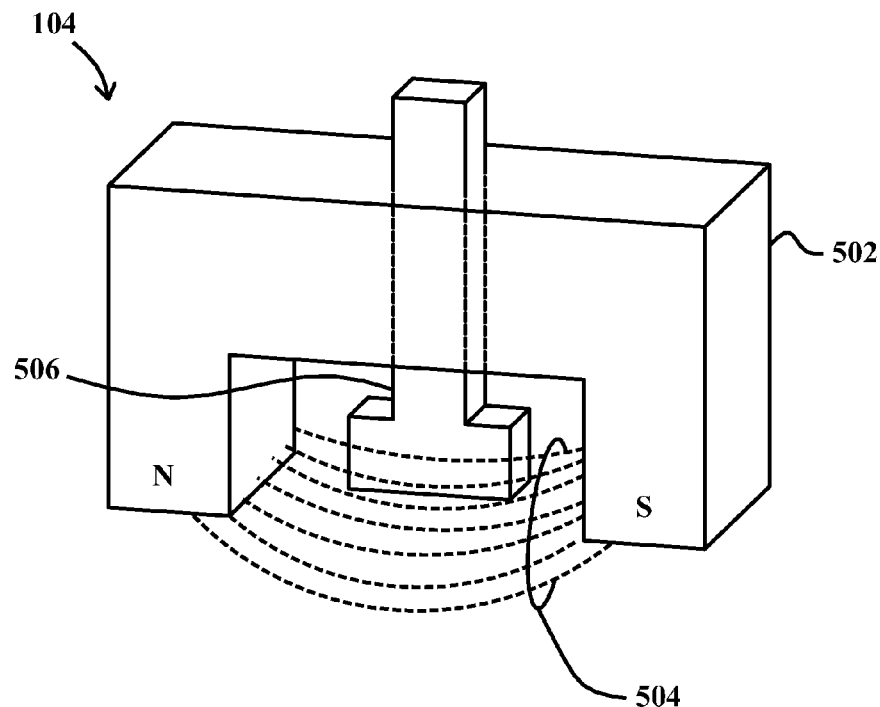
FIG. 5 a plan view of a bias device and a sensor of the removal detector of FIG. 2 in a removed position.
Figure 6:
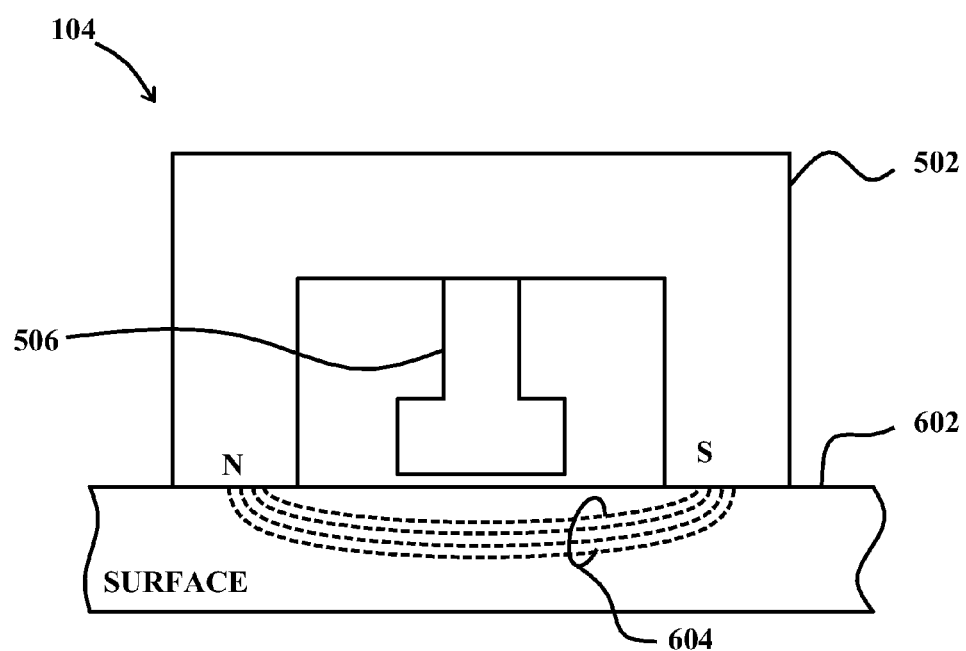
FIG. 6 a plan view of a bias device and a sensor of the removal detector of FIG. 2 in a coupled position.
Figure 7:
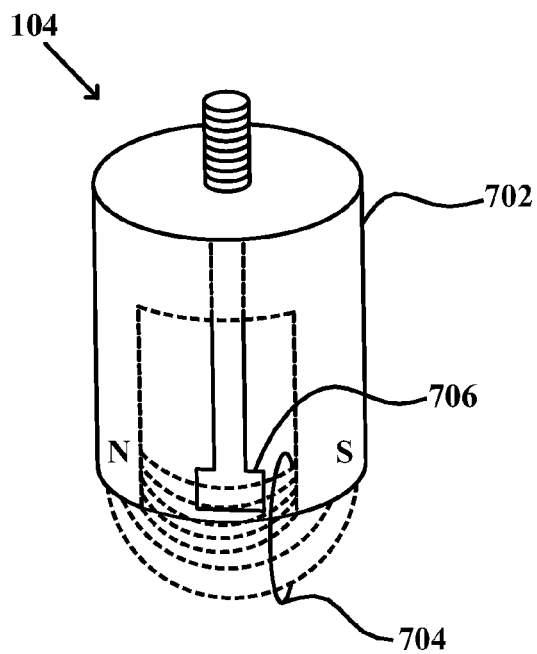
FIG. 7 a plan view of a bias device and a sensor of the removal detector of FIG. 2 in a removed position.
Figure 8:
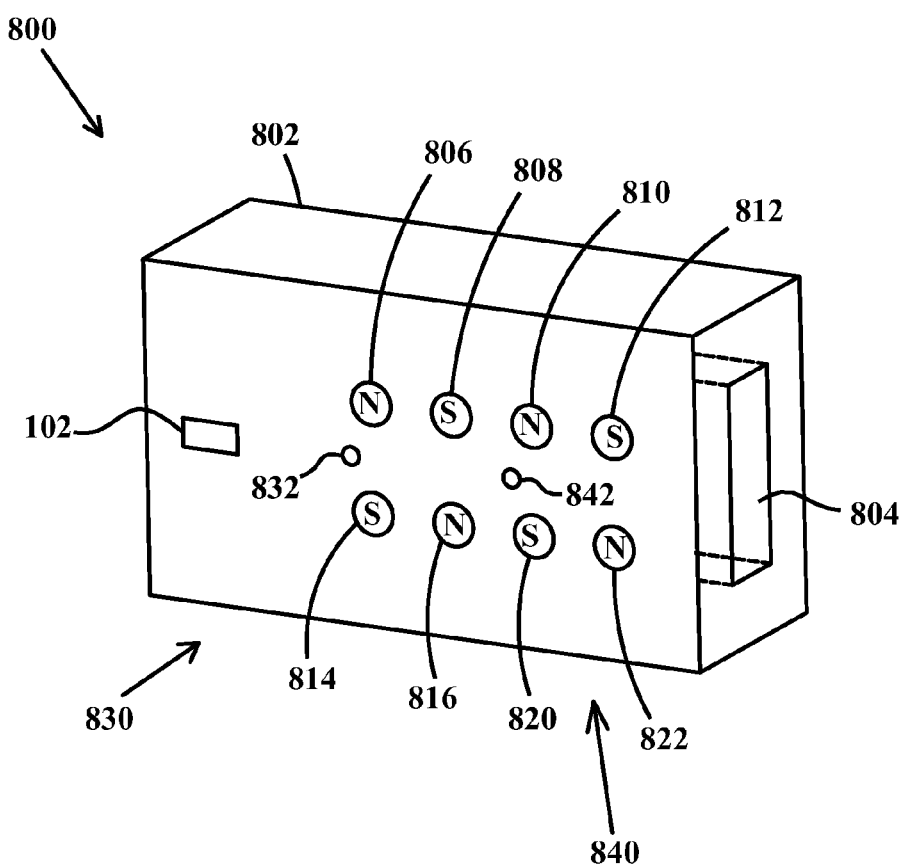
FIG. 8 a plan view of the security device of FIG. 1 having an implementation of the removal detector of FIG. 2.
Figure 9:
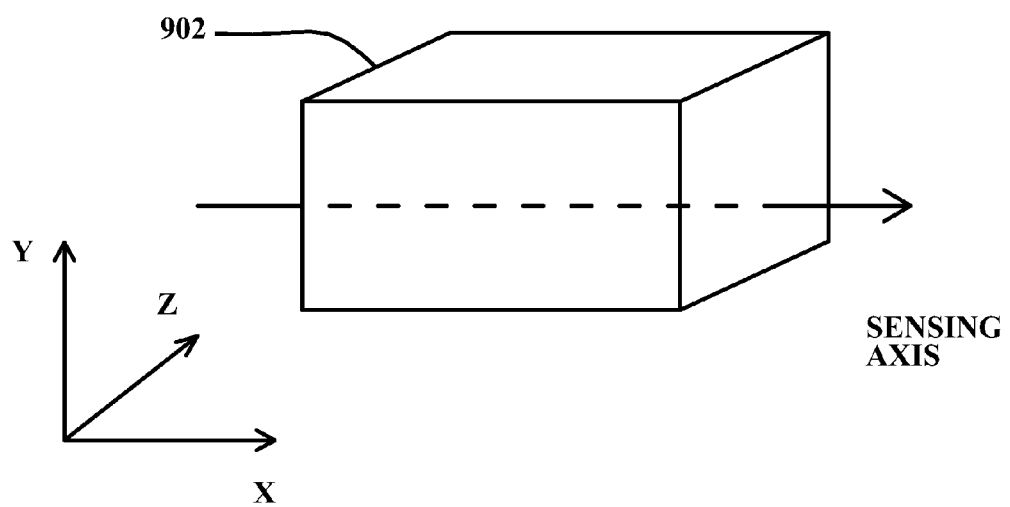
FIG. 9 a plan view a sensing axis of a sensor of the removal detector of FIG. 2.
Figure 10:
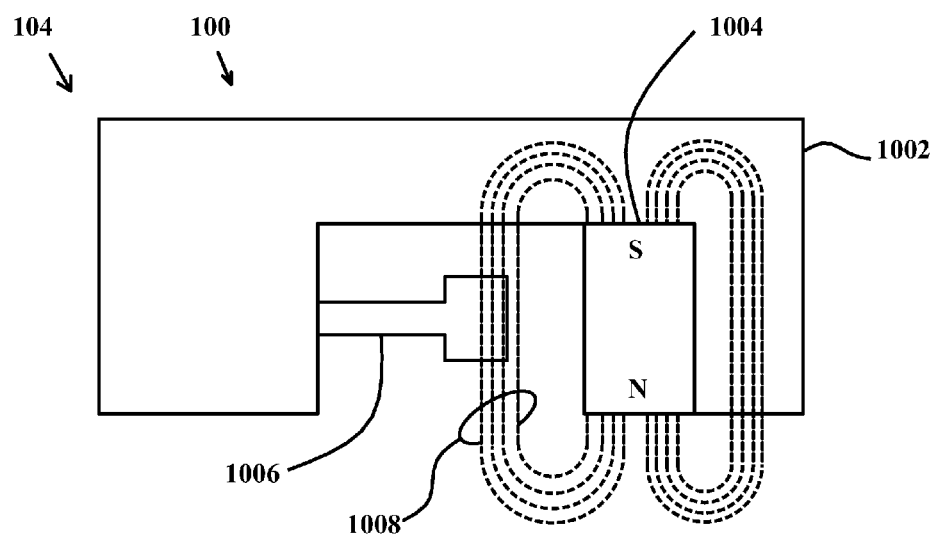
FIG. 10 a plan view of the security device of FIG. 1 having an implementation of the removal detector of FIG. 2 in a removed position.
Figure 11:
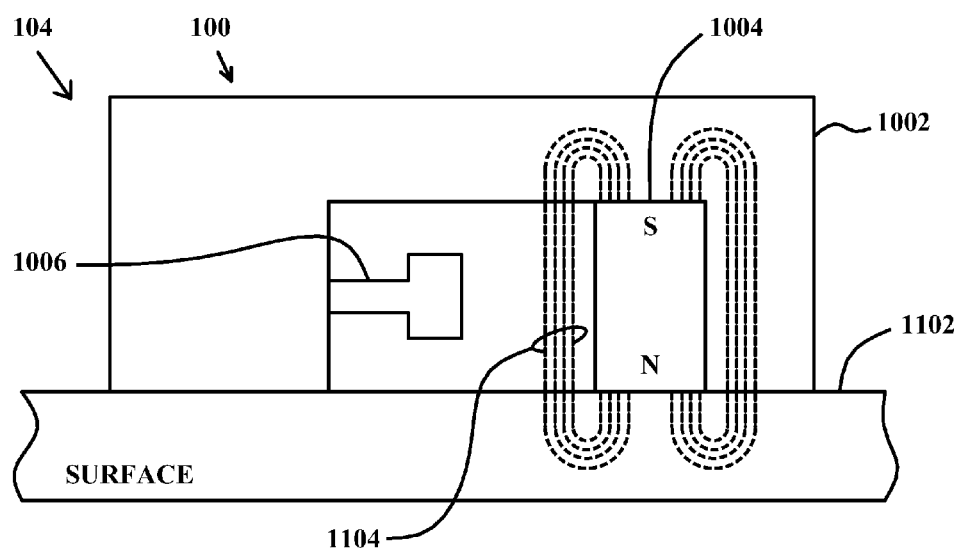
FIG. 11 a plan view of the security device of FIG. 1 having an implementation of the removal detector of FIG. 2 in a coupled position.
Figure 12:
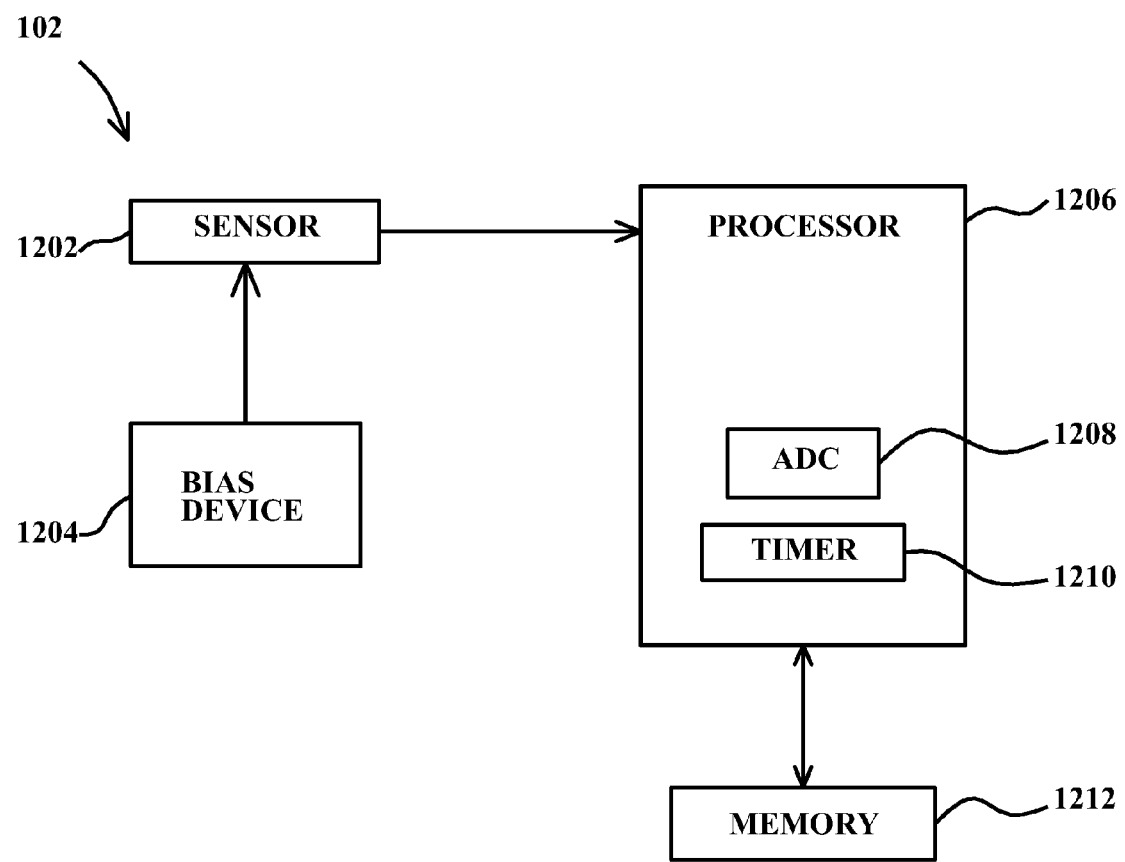
FIG. 12 is a functional block diagram of a portal sensor according to various aspects of the present invention.
Figure 13:
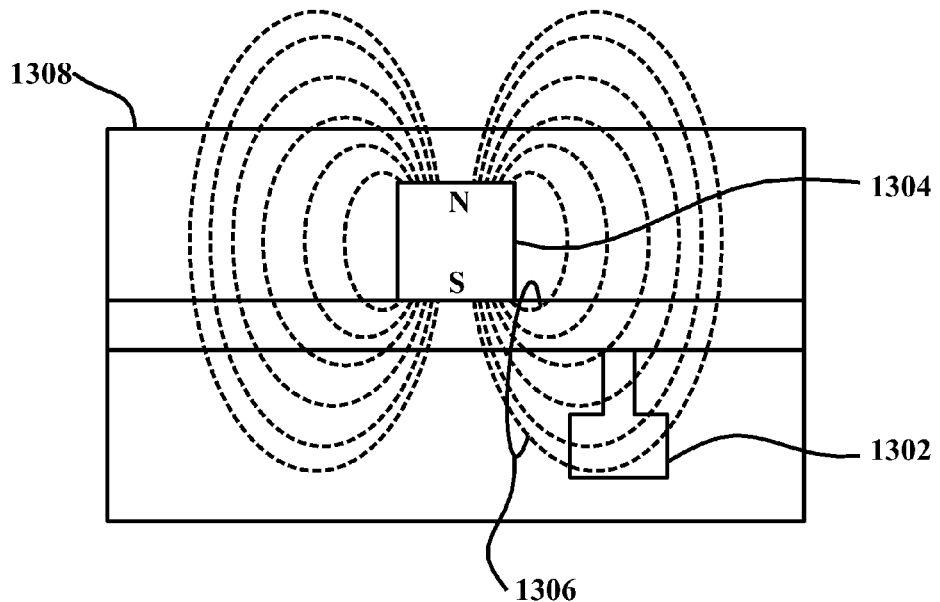
FIG. 13 a plan view of the security device of FIG. 1 having an implementation of the portal sensor of FIG. 12 in a position distal from a portal cover.
Figure 14:
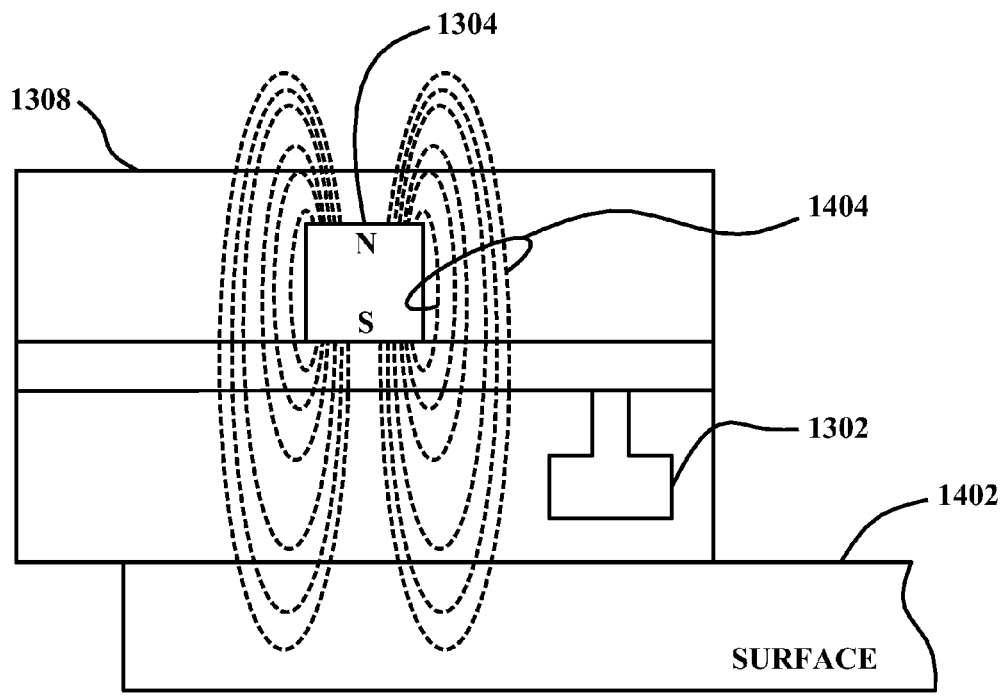
FIG. 14 a plan view of the security device of FIG. 1 having an implementation of the portal sensor of FIG. 12 in a position proximate to a portal cover.
Figure 15:
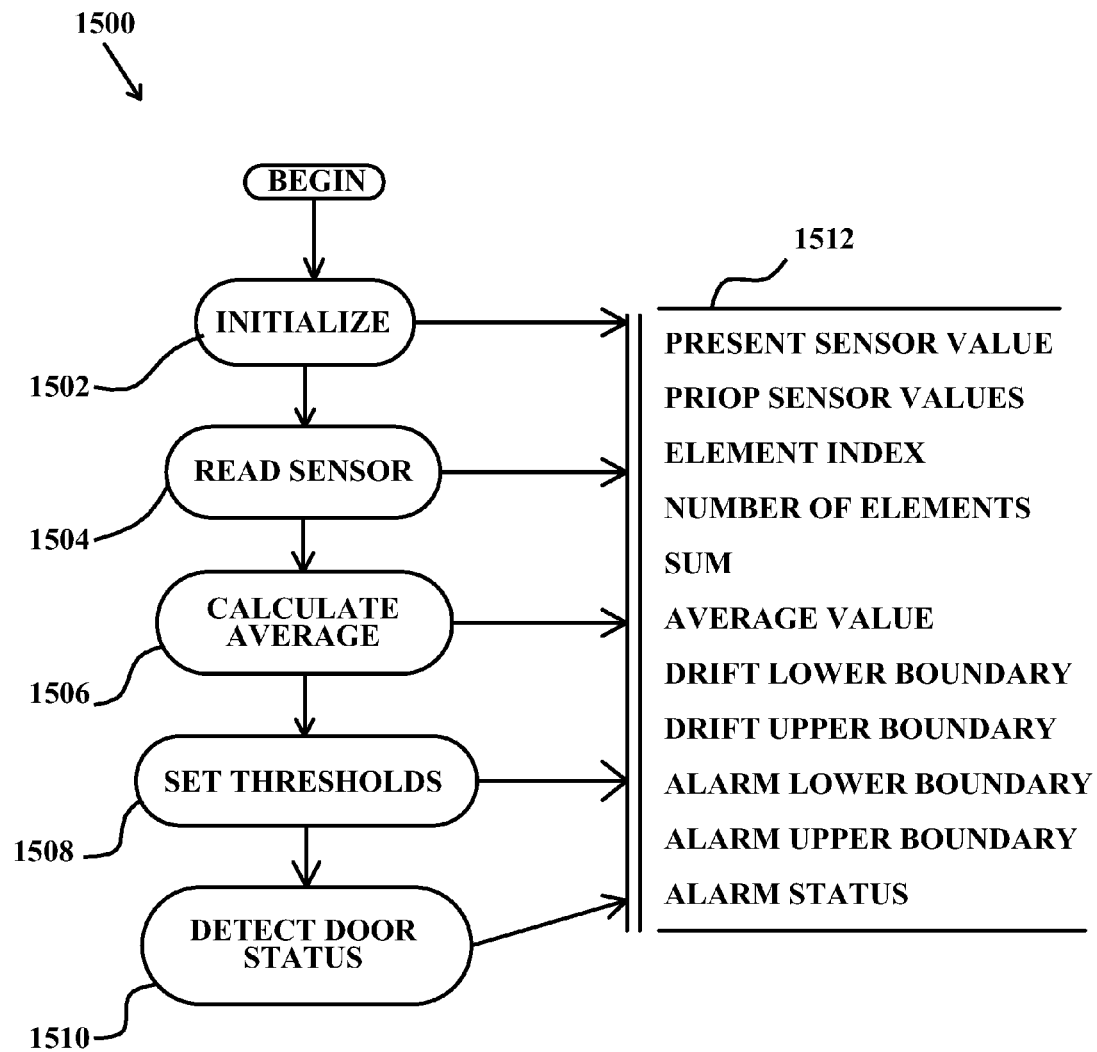
FIG. 15 is a data flow diagram of a method performed by security device of FIGS. 1, 8, and 12.

A security device may provide a warning of unauthorized access including a loud noise (e.g., siren, alarm, bell, human operator voice), transmitting a signal, receiving a signal, transmit a message, receive a message, and establishing communication with an authorized user (e.g., monitoring service). The security device may determine a type of warning action in accordance with a policy or a decision by a human operator. Lack of authorization may be detected by a failure to provide user specific information (e.g., pin, access code, employee ID number), time of access (e.g., outside of regular working hours), location of access (e.g., access to a particular site rarely or never authorized); time to respond (e.g., slow response from user, response before required), and type of response (e.g., user enters distress code).

A security device detects physical stimulus (e.g., electrical, magnetic, pressure, movement, temperature, light, electromagnetic radiation), physical quantities, physical characteristics, and/or a change in a physical quantity or characteristic to detect access to the secured area through a portal. For example a security device may detect changes in temperature, magnetic flux, motion, pressure exerted against an object; and light (e.g., intensity, wavelength), and radio frequency signals. A security device may detect changes (e.g., increase, decrease, average value, rate of change, departure from a quiescent value) in physical stimulus as indicia of access to the secured area. A security device may detect physical quantities of heat, light, vibration, and magnetic flux.

A security device may provide a warning of unauthorized access including a loud noise (e.g., siren, alarm, bell, human operator voice), transmitting a signal, receiving a signal, transmit a message, receive a message, and establishing communication with an authorized user (e.g., monitoring service). The security device may determine a type of warning action in accordance with a policy or a decision by a human operator. Lack of authorization may be detected by a failure to provide user specific information (e.g., pin, access code, employee id number), time of access (e.g., outside of regular working hours), location of access (e.g., access to a particular site rarely or never authorized); time to respond (e.g., slow response from user, response before required), and type of response (e.g., user enters distress code).

A security device may authenticate users. Authentication may compare user provided information with information maintained by the security device or knowledge of a human operator. User information may include a pin, biometric information (e.g., voice, iris, fingerprint, voice pattern, facial recognition), a password (e.g., a one-touch device, user supplied password, Dallas/Maxium "one-touch"), a phone number, an employee number, a bar code, and an RFID transmission. User information may be authenticated locally or transmitted to a remote location for authentication.

Status of the security device may include an amount of battery charge, a removal event, component health, physical stimulus detected, amounts of physical stimulus detected, and variations of physical stimulus. A removal event may include moving, shaking, or striking the security device without authorization. A security device may provide notice of the status of the security device. Notice may include transmitting a signal (e.g., radio transmission, flashing LED), transmitting a message (e.g., phone message, email, text message), and producing a noise (e.g., siren, alarm, bell, beep). Notice may include status information (e.g., amount of battery charge, receive signal strength, transmit signal strength, occurrence of a removal event, type of removal event).

A security device may provide information (e.g., report, summary, statistics) concerning access to the secured area. A report may include time of access, date of access, user information, security device status information, physical stimulus detected, notice provided, warning provided, policy implemented, and actions taken by a human operator. A security device may provide a report according to a policy (e.g., weekly, monthly, concurrent with notice of unauthorized access) or upon request.

For example, security device 100 of FIGS. 1-26, according to various aspects of the present invention, monitors access to a secured area accessible by a portal by monitoring a portal cover and detecting removal of the security device. Security device 100 may include one or more portal sensors 102, one or more removal detectors 104, zero or more motion sensors, access control 110 and zero or more communication modules 112.

A portal sensor detects ingress and egress through a portal to and from a protected area. A portal sensor detects physical stimulus, physical quantities, physical characteristics, and/or a change in a physical quantity or characteristic. A portal sensor may detect movement of a portal cover (e.g., door, window) as an indication of access through a portal. A portal sensor may report an event. Events may include greater than threshold amount of movement of a portal cover (e.g., opening, closing), greater than threshold duration of a portal cover in a particular position (e.g., open, closed, partially open), greater than threshold speed and/or acceleration of portal movement, and greater than threshold amount of force applied to the portal and/or the port cover (e.g., attack, destruction).

A removal detector detects removal of the security device from a location. A location includes position and/or orientation of the security device. A removal detector detects physical stimulus, physical quantities, physical characteristics, and/or a change in a physical quantity or characteristic. Physical stimulus used to detect a removal may include movement in a direction, vibration, change of a physical force, a change in orientation, and acceleration of the security device. A removal detector may detect an event (e.g., removal, replacement). A removal detector may report an event.

A removal detector may couple a security device to a surface. Coupling includes coupling a removal detector to a surface using a same physical stimulus monitored by the removal detector to detect removal. A surface includes a portal cover, a portal frame, a surface adjacent to a portal, and a surface adjacent to a portal cover.

A motion sensor detects movement of the security device. A motion sensor detects physical stimulus, physical quantities, physical characteristics, and/or a change in a physical quantity or characteristic. A motion sensor may detect a physical stimulus that is different from the physical stimulus detected by a removal detector. A motion sensor may detect an event. A motion sensor may report an event. An event may include motion greater than a threshold and vibration within a frequency range. A motion sensor includes any conventional motion and/or vibration sensor. An implementation of security device 100 includes a motion sensor that includes a piezo film strip.

Access control may receive event notices, apply policy for warning action, apply policy for a response to authorized and/or unauthorized access, and assist in event detection. Event notices may be reported to the access control from any sensor, detector, user (e.g., panic button), or system operator (e.g., system test). Access control may include any conventional data processing equipment, communication equipment, sensing equipment, and software. Assisting in event detection may include receiving physical stimulus, physical quantities, and/or physical characteristics from a sensor and/or detector to detect a change. Applying policy may include receiving user information, transmitting user information to a central location, receiving stored user information, transmitting stored user information, comparing user information to stored information, reporting authentication status (e.g., failed, successful), and determining a response to unauthorized access.

A communication module communicates with other units of a security system. Units of a security system may include security devices as described herein, an aggregator that aggregate information from a plurality of security devices, and a central location (e.g., manned, unmanned). A communication module communicates using any conventional hardware (e.g., wired, wireless) and any conventional protocol (e.g., TCP/IP, 802.11, Zigbee, cellular telephone). A communication module receives and/or transmits information. Information may include reports, event notices, policy, actions taken according to policy, user information, stored information, physical stimulus detected, physical quantities detected, physical characteristics detected, and/or a change in a physical quantity or characteristic detected.

Access control may use information received by the communication module. Access control may transmit information to another unit using the communication module.

An implementation of security device 100 may include portal sensor 102, removal detector 104, motion sensor 106, access control 110, and communication module 112.

Removal detector 104 may include bias device 206, sensor 202, and comparator 204.

A sensor detects physical stimulus, physical quantities, physical characteristics, and/or a change in a physical quantity or characteristic. A sensor may detect indicia of removal. A sensor may include any conventional sensing equipment and software. For example, sensor 202 may include a magnetic flux sensor (e.g., Hall effect sensor, a magnetometer, a gaussmeter), vibration sensors, current sensors, voltage sensors, light sensors, location sensors (e.g., GPS), and motion sensor (e.g., field of view differencing detectors, illumination change detectors, change of reflectivity detectors).

A bias device provides a physical stimulus of the type of physical stimulus detected by the sensor. A bias device provides a base quantity (e.g., magnitude) of a physical stimulus. A sensor detects at least a portion of the base quantity. Environmental factors (e.g., proximity to a physical object, human activity, movement) may affect the quantity of the base stimulus detected by the sensor. Environmental factors may increase or decrease the quantity of the physical stimulus detected by the sensor.

A comparator receives information regarding the quantity of the physical stimulus detected by the sensor. A comparator may detect a threshold change in the quantity of the physical stimulus detected by the sensor. A comparator may apply a hysteresis to the information received from the sensor to reduce an effect that noise may have on the quantity of the physical stimulus reported by the sensor. A comparator may provide a notice in accordance with detecting a threshold change in the quality of physical stimulus detected by the sensor. A notice may include a voltage, a current, and a data packet of a communication protocol. A threshold may be adjusted. Adjustment includes increasing, decreasing, and maintaining a value of the threshold. An adjustment may be made in accordance with temperature, age, duty cycle, and environmental conditions.

In one implementation, bias device 206 includes magnets 310 and 312. Sensor 202 includes hall switch 314. Hall switch 314 includes a comparator having a threshold. Hall switch 314 provides an electrical signal in accordance with a change in the magnitude of the magnetic flux detected by hall switch 314 greater than the threshold. Hall switch 314 is positioned in such a manner that at least a portion of magnetic flux 308 between a pole of magnet 310 and a pole of opposite polarity of magnet 312 conducts through hall switch 314. Magnetic flux 306 between a pole of magnet 310 and a pole of opposite polarity of magnet 312 conducts away from hall switch 314 through metal 304.

Movement of removal detector 104 to a position proximate to metal surface 402 conducts magnetic flux 404 (e.g., at least a portion of magnetic flux 308) away from Hall switch 314. Hall switch 314 detects a change between the magnitude of the magnetic flux 308 and 404 that conducts through hall switch 314. Hall switch 314 provides a signal in accordance with detecting the change. Hall switch 314 may provide the signal to access control 110. The signal provides indicia of a removal of removal sensor 104 from metal surface 402.

Removal detector 104 may couple to security device 100 in such a manner that movement of security device 100 results in detectable movement in removal detector 104. The above implementation of removal detector 104 may detect removal of removal device 104, and thus security device 100, from surface 402. Coupling removal detector 104 to security device 100 and/or to metal surface 402 may include attaching with glue, securing with a fastener, and coupling with magnetic force.

In one implementation, security device 100 includes metal 304 in body 302. Magnets 310 and 312 magnetically couple to metal 304. Magnets 310 and 312 may be further held in a position using structure related to body 302 or metal plate 304. Structure may include walls, supports, and recesses.

Hall switch 314 couples to security device 100. The coupling of Hall switch 314 to security device 100 includes using a fastener and positioning hall switch 314 in a bore in metal 304. Hall switch 314 couples in such a manner that hall switch 314 does not move (e.g., rotational movement, vertical movement, horizontal movement) with respect to magnet 310 and magnet 312 as security device 100 moves. Accordingly, movement of security device 100 from a position away from metal surface 402 to a position proximate (e.g., in contact) to metal surface 402 does not change the position between hall switch 314, magnet 310 and/or magnet 312. A spaced between sensor 202 and bias device 206 may be potted to reduce movement between sensor 202 and bias device 206.

The physical stimulus provided by bias device 206 may further provide a coupling force. The coupling force may couple removal detector 104 to security device 100 and/or to an object. As mentioned above, in one implementation, magnets 310 and 312 of removal detector 104 magnetically couple to metal 304 of security device 100. Magnets 310 and 312 may further magnetically couple security device 100 to metal surface 402. Coupling security device 100 to metal surface 402 conducts magnetic flux 404 away from Hall switch 314. Removal of security device 100 from metal surface 402 permits at least a portion of magnetic flux 308 to conduct through Hall switch 314. Detection of a change in the magnitude of the magnetic flux through Hall switch 314 provides indicia of a removal or an attachment of security device 100 from/to metal surface 402.

Metal surface 402 may include a metal door, a door with a metal surface, a door having a metal portion, a metal portal cover, a surface adjacent to a portal.

An implementation of removal detector 104 includes unshaped magnet 502 and hall switch 506 positioned in the cavity of unshaped magnet 502. At least a portion of magnetic flux 504 from a north pole and a south pole of magnet 502 conducts through hall switch 506. Placement of removal detector 104 proximate to metal surface 602 conducts magnetic flux 604 (e.g., at least a portion of magnetic flux 504) away from Hall switch 506. Hall switch 506 detects a change between the magnitude of the magnetic flux 504 and 604. Hall switch 506 provides a signal in accordance with detecting the change.

An implementation of removal detector 104 includes cylindrical magnet 702 and hall switch 706 positioned in a cavity of magnet 702. At least a portion of magnetic flux 704 from a north pole and a south pole of magnet 702 conducts through Hall switch 706. Placement of removal detector 104 proximate to a metal surface conducts at least a portion of magnetic flux 704 away from Hall switch 706. Hall switch 706 detects a conducting away of magnetic flux away from Hall switch 706 when removal detector 104 is positioned proximate to a metal surface. Hall switch 706 provides a signal in accordance with detecting a conducting away.

An implementation of security device 800 includes at least one of removal detectors 830 and 840. Magnets 806-822 provide a magnetic flux that conducts through hall switches 832 and 842. Magnets 810 and 820 may provide a primary magnetic flux that conducts through Hall switch 842. Magnets 806, 808, 812, 814, 816, and 822 may provide a secondary magnetic flux that may increase or decrease the magnitude of the magnetic flux provided by magnets 810 and 820 and that conducts through hall switch 842.

The poles of magnets 806-822 may be arranged to increase or decrease a magnetic flux that conducts through hall switch 832 and/or 842. For example, magnets 806-812 may be positioned such that their north poles are oriented in the same direction and the south poles of magnets 814-822 are positioned opposite. Such an arrangement may increase a magnetic flux detected by hall switches 832 and 842 when security device 800 is not proximate to a metal surface. The arrangement of magnetic poles shown in FIG. 8 may decrease a magnitude of magnetic flux detected by hall switches 832 and 842 when security device 800 is not proximate to a metal surface.

Magnets 806-822 may further be used to mount removal detectors 832 and 842 to body 802 of security device 800 and/or to a metal surface (not shown). In this implementation, magnets 806-822 magnetically couple to metal plate 804 of body 802. Hall switch 832 and 842 also couple to body 802 in such a manner that hall switch 832 and 842 to not move with respect to magnets 806-822. Placement of security device 800 proximate to a metal surface (not shown) magnetically couples security device 800 to the metal surface and further conducts at least a portion of the magnetic flux of magnets 806-822 away from Hall switch 832 and 842.

A sensor may have a sensing axis. A sensing axis includes an axis through a sensor. Providing a physical stimulus along a sensing axis may permit a sensor to have greater sensitivity in detecting a magnitude of a physical stimulus. For example, sensor 902 is shown relative to orthogonal x, y, and z axes. A sensing axis of sensor 902 comprises the x-axis. Accordingly, detector 902 may detect a physical stimulus provided along the x-axis while the same magnitude of a physical stimulus provided along any other axis or direction may be detected to a lesser extent or not at all.

In the case of a magnetic sensor, positioning the sensing axis relative to a magnetic flux provided by a bias magnet may permit a magnetic sensor to have greater sensitivity in detecting variations in a magnitude of the magnetic flux. Increased sensitivity enables sensor 202 to detect smaller variations in the magnitude of the magnetic flux and/or to be less immune to noise. A magnetic flux includes a flow of magnetic stimulus between poles of opposite polarity. For example, a magnetic flux flows between a north pole and a south pole (or visa versa) of magnets 312 and 310; magnet 502, magnet 702, magnets 810 and 820 (not shown), and magnet 1004.

Positioning the sensing axis relative to a magnetic flux includes positioning the sensing axis perpendicular, parallel, and at an angle to the magnetic flux. In an implementation, the sensing axis of Hall switch 314 is positioned perpendicular to magnetic flux 308. In another implementation, Hall switch 1006 is positioned perpendicular to magnetic flux 1008. Magnet 1004 of removal detector 104 couples to body 1002 of security device 100. At least a portion of magnetic flux 1008 conducts through Hall switch 1006 when security device 100 is positioned away from metal surface 1102. Magnetically coupling security device 100 to metal surface 1102 using magnet 1004 conducts magnetic flux 1104 (at least a portion of magnetic flux 1008) away from Hall switch 1006. Hall switch 1006 detects a change between the magnitude of the magnetic flux 1008 and 1104. Hall switch 1006 provides a signal in accordance with detecting the change.

Portal sensor 102 may include sensor 1202, bias device 1204, processor 1206 and memory 1212. Sensor 1202 may include hall sensor 1302. Bias device 1204 may include magnet 1304.

Processor 1206 includes a conventional programmable controller circuit having a microprocessor, memory, timer, and analog to digital converter programmed according to various aspects of the present invention, to perform methods discussed below. The microprocessor executes on a stored program and data. Portal sensor 102 may include process 1206 or methods performed by processor 1206 may be performed by a processor that also performs methods for access control 110.

An implementation of portal sensor 102 includes Hall sensor 1302 and magnet 1304. Magnet 1304 provides a magnetic flux. At least a portion of the magnetic flux from magnet 1304 conducts through Hall sensor 1302. Hall sensor 1304 provides indicia of a magnitude of a magnetic flux 1306 that conducts through hall sensor 1302. Indicia of a magnitude of a magnetic flux includes a voltage proportional to a magnetic flux and a current proportional to a magnetic flux.

Hall sensor 1302 and magnet 1304 mount in body 1308 of security device 100 in such a manner that movement of security device 100 and/or a portal does not move sensor 1302 with respect to magnet 1304.

Movement of portal sensor towards and/or away from a metal portion of a portal changes a magnitude of the magnetic flux (e.g., 1306, 1402) that conducts through Hall sensor 1302. A magnitude of magnetic flux that conducts through Hall sensor 1302 is proportional to a distance between body 1308 of security device 100 and portal cover 1402. A portal cover includes a metal door, a door having a metal portion, a door having a metal surface, and a window with a metal portion. Hall sensor 1302 detects a magnitude of the magnetic flux through Hall sensor 1302. Hall sensor 1302 provides indicia of the magnitude of the magnetic flux to processor 1206 to perform methods described below.

Methods, discussed herein, performed by security device 100 may be performed by any combination of initializing, reading, calculating, setting, and detecting capabilities of the available components of the security device. Data used by security device 100 to perform methods may be stored, retrieved, converted, averaged, summed, compared, transmitted, and displayed. Security device 100 may perform a function in accordance with a result of performing a method. For example, portal sensor 102 may perform methods 1500 of FIG. 15. Some methods of 1500 may be distributed to other components communicated by communication module 112.

A dataflow diagram describes the cooperation of processes that may be implemented by any combination of serial and parallel processing. In a fully parallel implementation, an instance of each required process is instantiated when new or revised data for that process is available; or, a static set of instances share processing resources in a single or multi-threaded environment, each process operating when new or revised data is available to that process.

Process 1500 may begin upon reset and/or power up of security device 100. Process 1500 may also begin in accordance with a software command executed by processor 1206 or through a process for exception handling.

Initializing process 1502 prepares data and components to perform the other processes of process 1500. Preparing data includes setting a data to an initial value. For example, setting element index to a first element of an array of elements for storing a series of prior sensor values; setting each element of the array of elements to an initial value; and setting sum and average value to zero. Preparing a component includes resetting analog-to-digital converter 1208, setting timer 1210 to an initial value, establishing interrupt intervals for processor 1206, and establishing interrupt vectors for processor 1206.

Initialization process 1502 may further establish a magnitude of a magnetic flux through sensor 1302 that represents a closed position of a portal cover.

Read sensor process 1504 receives data from sensor 1202. Data from sensor 1202 includes indicia of a magnitude of a physical stimulus detected by sensor 1202. For example, data from sensor 1202 may include indicia of a magnitude of a magnetic flux conducted through sensor 1302. Data from sensor 1202 may be stored in data store 1512. For example, data read from sensor 1202 may be stored in a data referred to as present sensor value.

Calculate average process 1506 determines and average value of the data received from sensor 1202 with respect to prior data received from sensor 1202. A data structure (e.g., array, linked list) may store prior sensor values. The data structure may be accessed using an element index. The number of elements in the data structure may be stored as a data referred to as number of elements. The present sensor value may be combined with the prior sensor values in such a manner as to produce a sum of all values read from sensor 1202 up to the number of elements. An average value of prior sensor values may be produced by dividing the sum by the number of valid values present in the prior sensor values structure.

Data and intermediate values may be stored in data store 1512 and accessed by processor 1206. Data store 1512 may be located in memory 1212.

Calculating an average value may compensate for drift in the operation of components of portal sensor 102. For example, averaging a series of values received from sensor 1202 may compensate for a drift in the values received from sensor 1202 over temperature and time (e.g., aging of sensor, bias device).

Set thresholds process 1508 establishes thresholds for use by other processes. Thresholds may be used to determine whether to perform an action. An action may include using data received from sensor 1202 to form an average, discarding data received from sensor 1202, and setting an alarm status (e.g., active, inactive, early warning). A threshold includes any threshold used by process 1500 to perform the processes of security device 100. For example, thresholds set by set threshold process 1508 may include a drift threshold and an alarm threshold. A threshold may include a single value, a series of values, and a value having an upper boundary and a lower boundary.

An implementation of process 1500 uses a drift threshold and an alarm threshold that each has an upper boundary and a lower boundary respectively. An average value of data received from sensor 1202 may be calculated in accordance with the drift threshold. For example, data received from sensor 1202 having a value that falls within the drift threshold (e.g., greater or equal to a lower boundary, less than or equal to an upper boundary) is used to calculate an average value for sensor data as discussed above. Data received from sensor 1202 having a value that falls outside the drift threshold (e.g., less than a lower boundary, great than an upper boundary) is not used to calculate an average value.

An alarm status may be set in accordance with the alarm threshold. For example, data received from sensor 1202 having a value that falls within the alarm threshold (e.g., greater or equal to a lower boundary, less than or equal to an upper boundary) indicates movement of a portal cover within a limit, thus the alarm status may be set to inactive. Data received from sensor 1202 having a value that falls outside the alarm threshold (e.g., less than a lower boundary, great than an upper boundary) indicates movement of a portal cover beyond a limit, thus the alarm status may be set to active. Data received from sensor 1202 having a value that falls outside the alarm threshold followed by a subsequent value that falls within the alarm threshold or a pattern that falls within and outside the alarm threshold over a period of time may permit the alarm status to be set to an early warning state.

Set thresholds process 1508 may set a threshold to compensate for drift in the operation of components of portal sensor 102. An implementation of portal sensor 102 sets threshold values in accordance with an average value of the data received from sensor 1202.

An implementation of portal sensor 102 sets a drift threshold to account for noise (e.g., jitter, thermal, electrical, mechanical) that influences detection by sensor 1202. An implementation of portal sensor 102 sets the drift boundary as being equivalent to the six least significant bits of analog-to-digital converter 1208.

An implementation of portal sensor 102 sets an alarm threshold to set a limit on portal movement. The limit is set in accordance with the range of motion detectable by sensor 1202.

Detect door status process 1510 detects a position of a portal cover. Detecting a position of a portal cover includes detecting movement of a portal cover outside of a limit. Detect door status process 1510 sets an alarm status in accordance with detecting as discussed above. For example, as discussed above, a value received from sensor 1202 outside the alarm threshold indicates that the alarm status may be set to active.

Any conventional computational techniques may be used to determine whether a data value received from sensor 1202 falls within or outside a threshold (e.g., comparison to threshold values, rate of change, amount of change from previous value).

Figure 16:
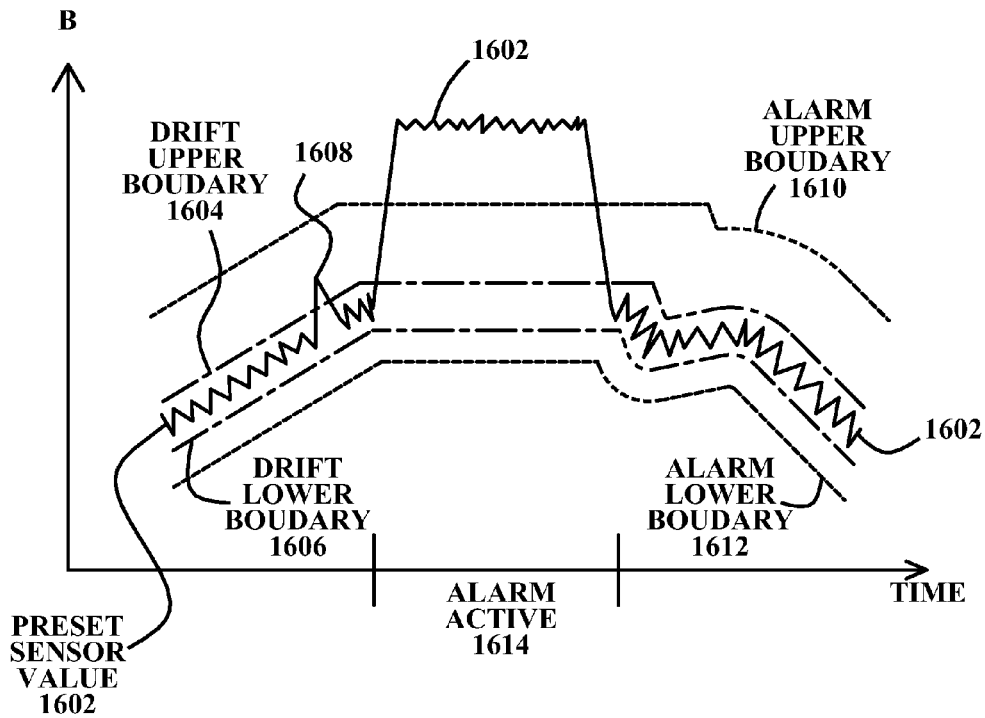
FIG. 16 is a diagram of indicia of a magnetic flux, a drift threshold, and an alarm threshold of the portal sensor of FIG. 12 over time.

FIG. 16 represents an implementation of process 1500 including data values receive from sensor 1202 and values set for the drift and alarm thresholds. In FIG. 16, squiggly line 1602 represents a series of present sensor values received from sensor 1202. Data from sensor 1202 that falls within drift upper boundary 1604 and drift lower boundary 1606 are used to calculate the average value of the data received from sensor 1202. Datum 1608 from sensor 1202 falls outside of the drift threshold and is not used to calculate an average value. Datum 1608 falls within the alarm threshold. Active alarm status 1614 occurs when data from sensor 1202 that falls outside the alarm threshold.

Figure 17:
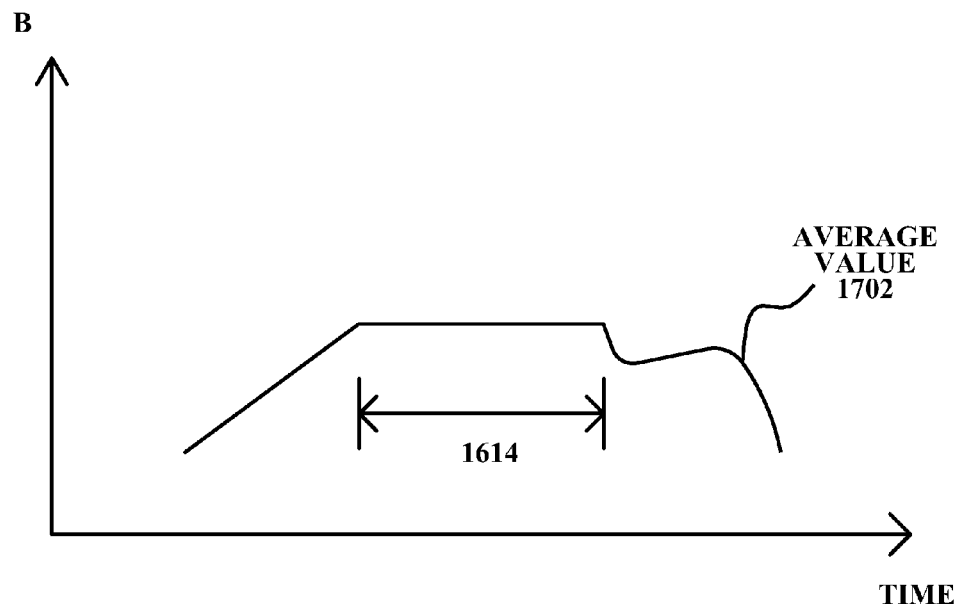
FIG. 17 is a diagram of an average value of the indicia of magnetic flux of FIG. 16.
Figure 18:
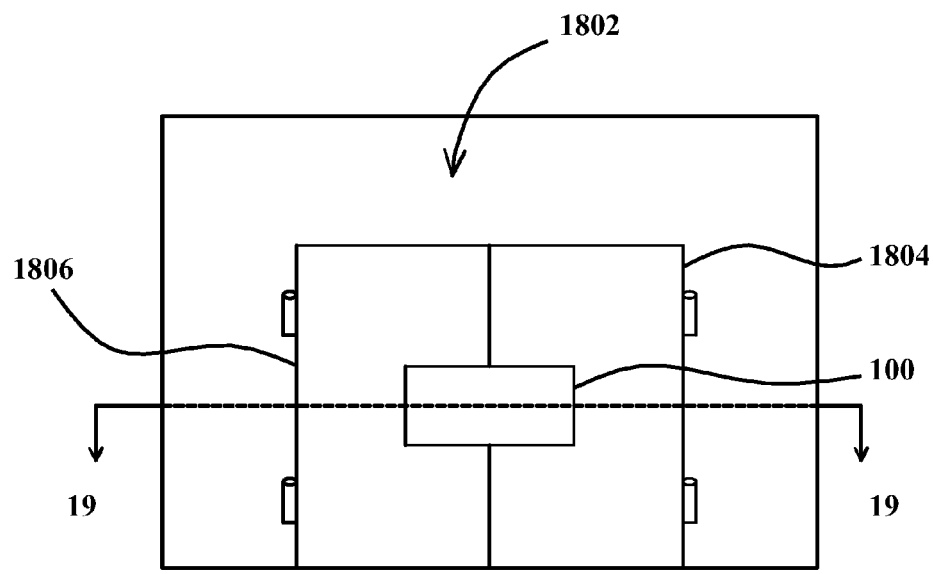
FIG. 18 is a plan view of the security device of FIG. 1 positioned on a portal cover having a right portal cover and a left portal cover.
Figure 19:
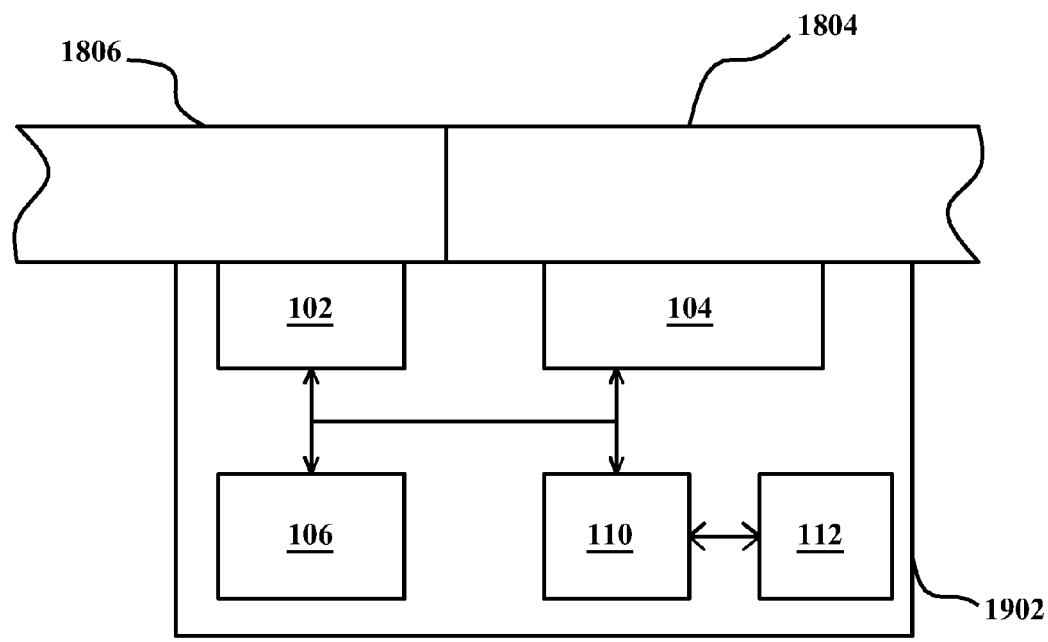
FIG. 19 is a plan view of an implementation of the security device of FIG. 1 positioned as shown in FIG. 18.
Figure 20:
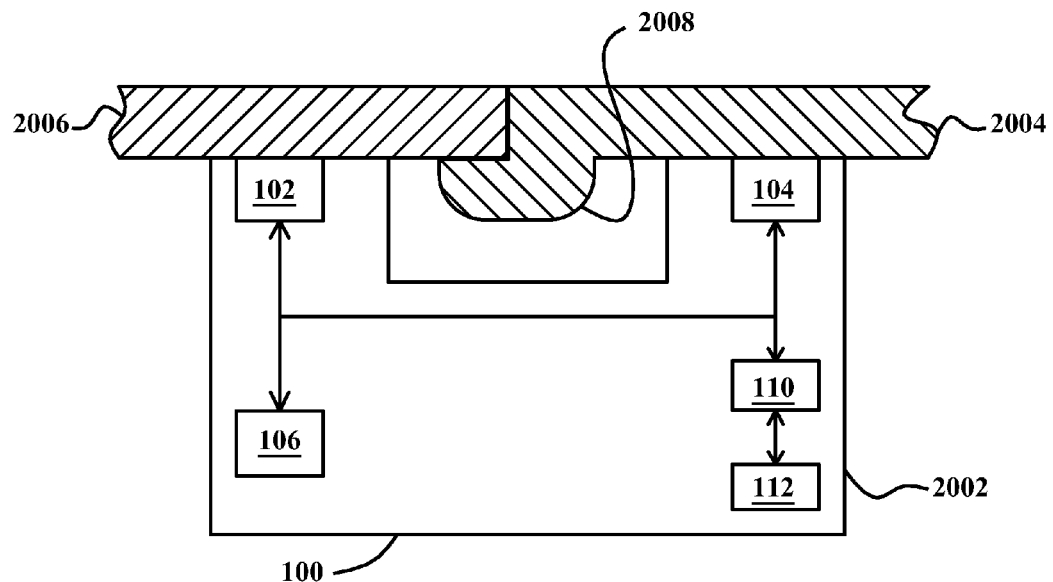
FIG. 20 is a plan view of an implementation of the security device of FIG. 1.

Line 1702 of FIG. 17 represents the average value of the values of squiggly line 1602 that falls within the drift threshold. The average value does not change during the alarm active status because no data from sensor 1202, as depicted in FIG. 16, falls within the drift threshold accordingly the average value does not change.

Security device 100 may couple to any object to detect removal. Security device 100 may be positioned to detect movement of a portal cover. In one implementation, security device 100 magnetically couples to right portal cover 1804 and detects movement of adjacent left portal cover 1806. Removal detector 104 magnetically couples body 1902 of security device 100 to right portal cover 1804. Portal sensor 102 detects movement of left portal cover 1806 relative to security device 100 and thus right portal cover 1804. Movement of left portal cover 1806 relative to right portal cover 1804 greater than a threshold may result in a warning of unauthorized access. Removal of body 1902 from right portal cover 1804 may result in a warning of unauthorized access.

Security device 100 may couple to and monitor a variety of portals. For example, a shape of the body of security device 100 may fit a particular portal construction. In one implementation, body 2002 of security device 100 positions removal detector 104 and portal sensor 100 on each side of seal 2008 between right portal cover 2004 and left portal cover 2006.

Figure 21:
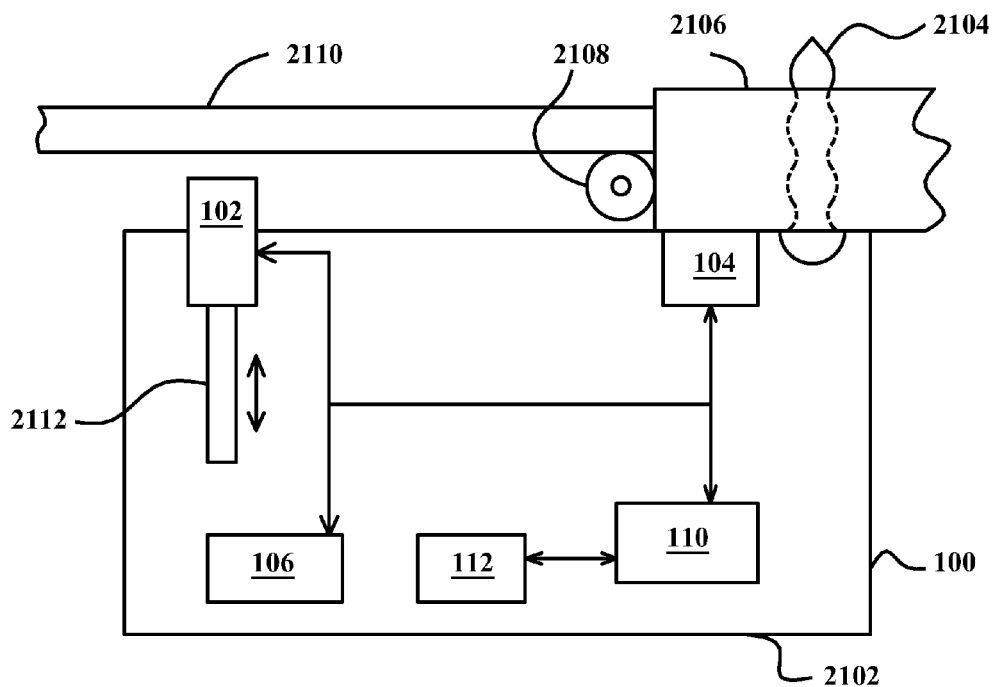
FIG. 21 is a plan view of an implementation of the security device of FIG. 1 having a track that permits sensor movement.
Figure 22:
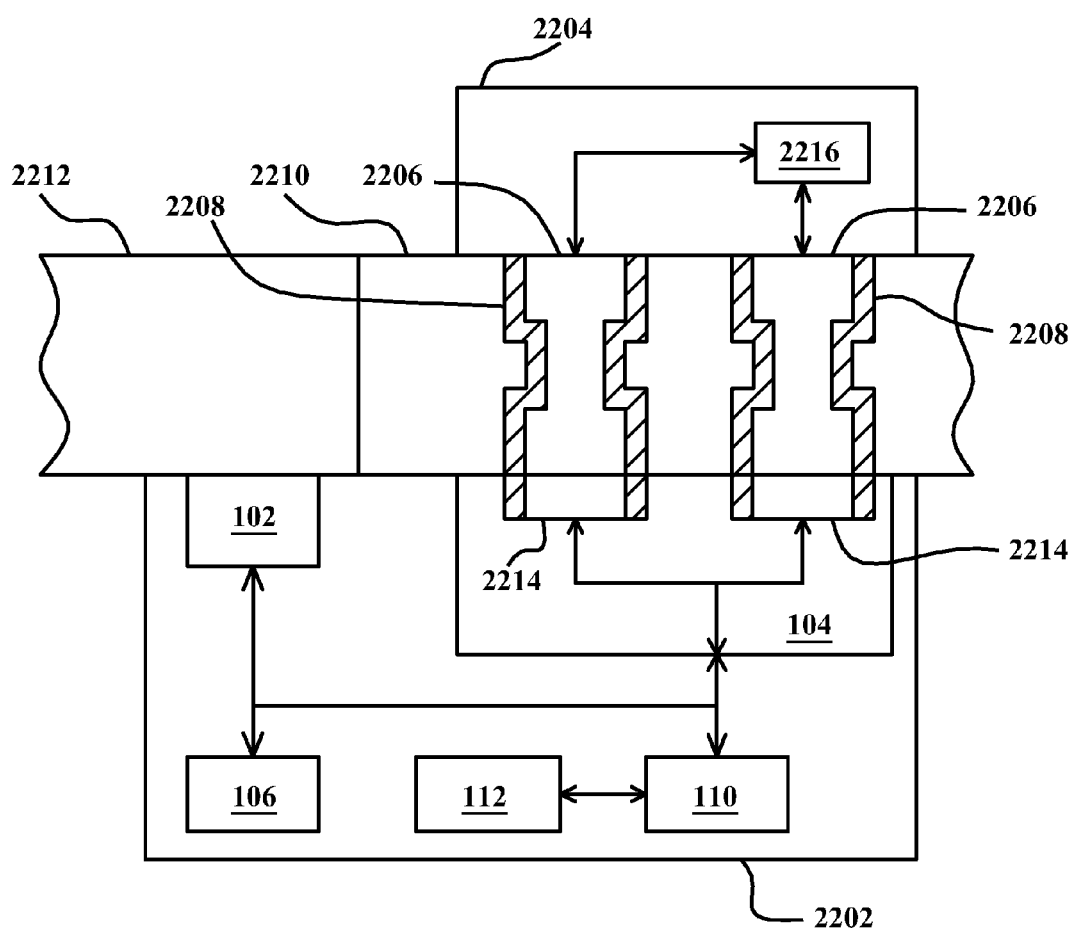
FIG. 22 is a plan view of an implementation of the security device of FIG. 1 that provides a signal through a portal cover.
Figure 23:
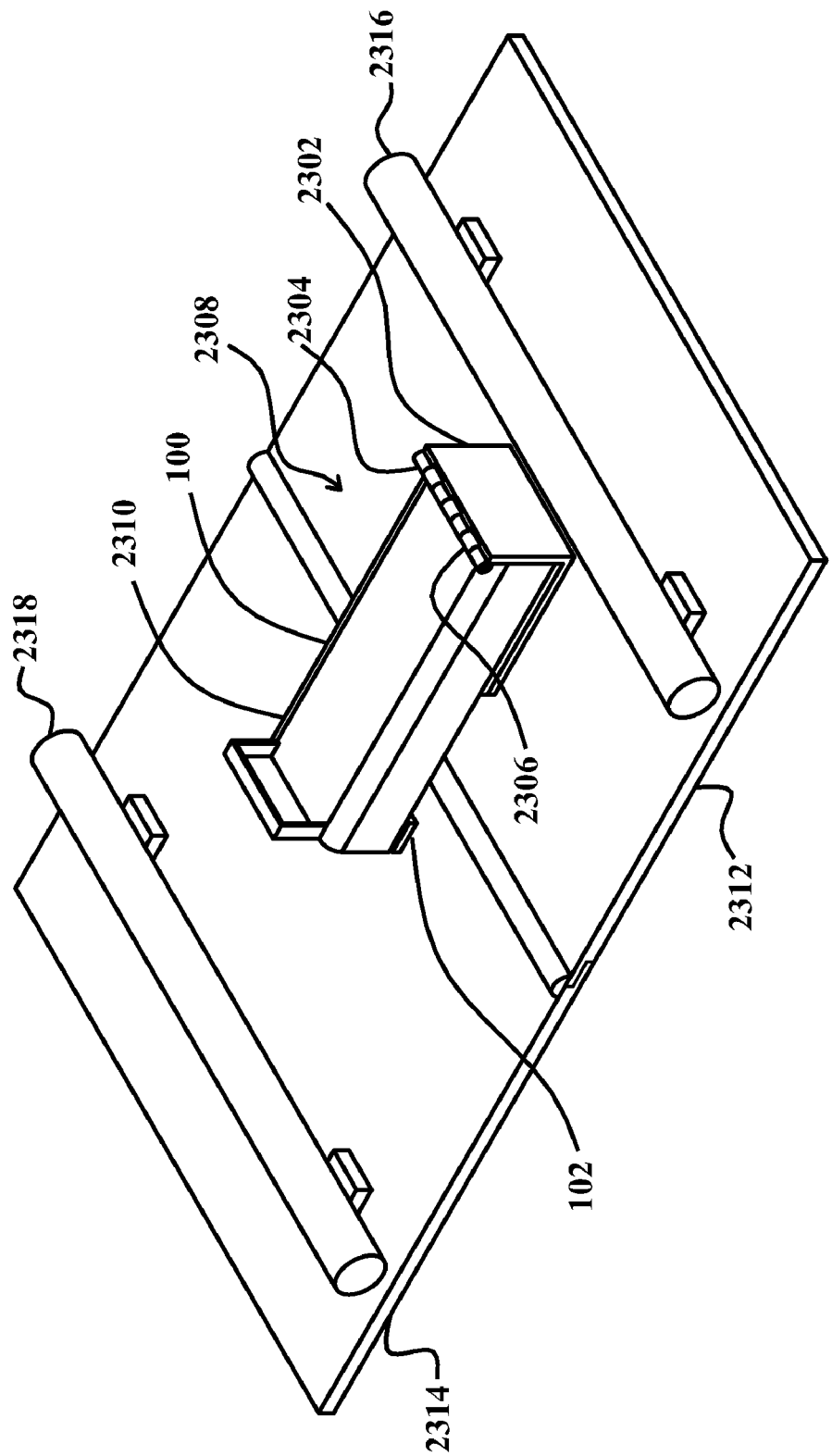
FIG. 23 is a perspective plan view of the security device of FIG. 1 having an implementation of a coupling apparatus according to various aspects of the present invention.
Figure 24:
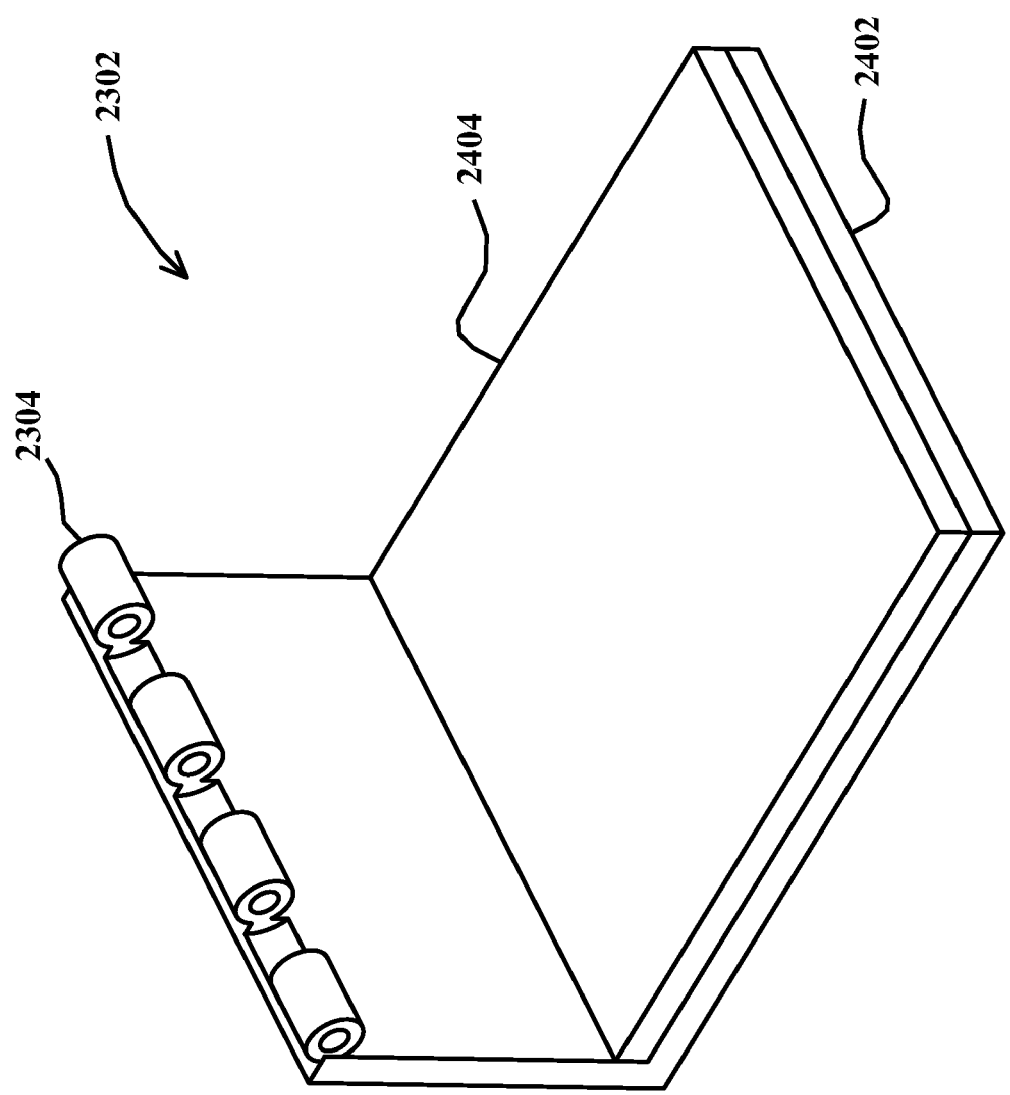
FIG. 24 is a perspective view of the coupling apparatus of FIG. 23.
Figure 25:
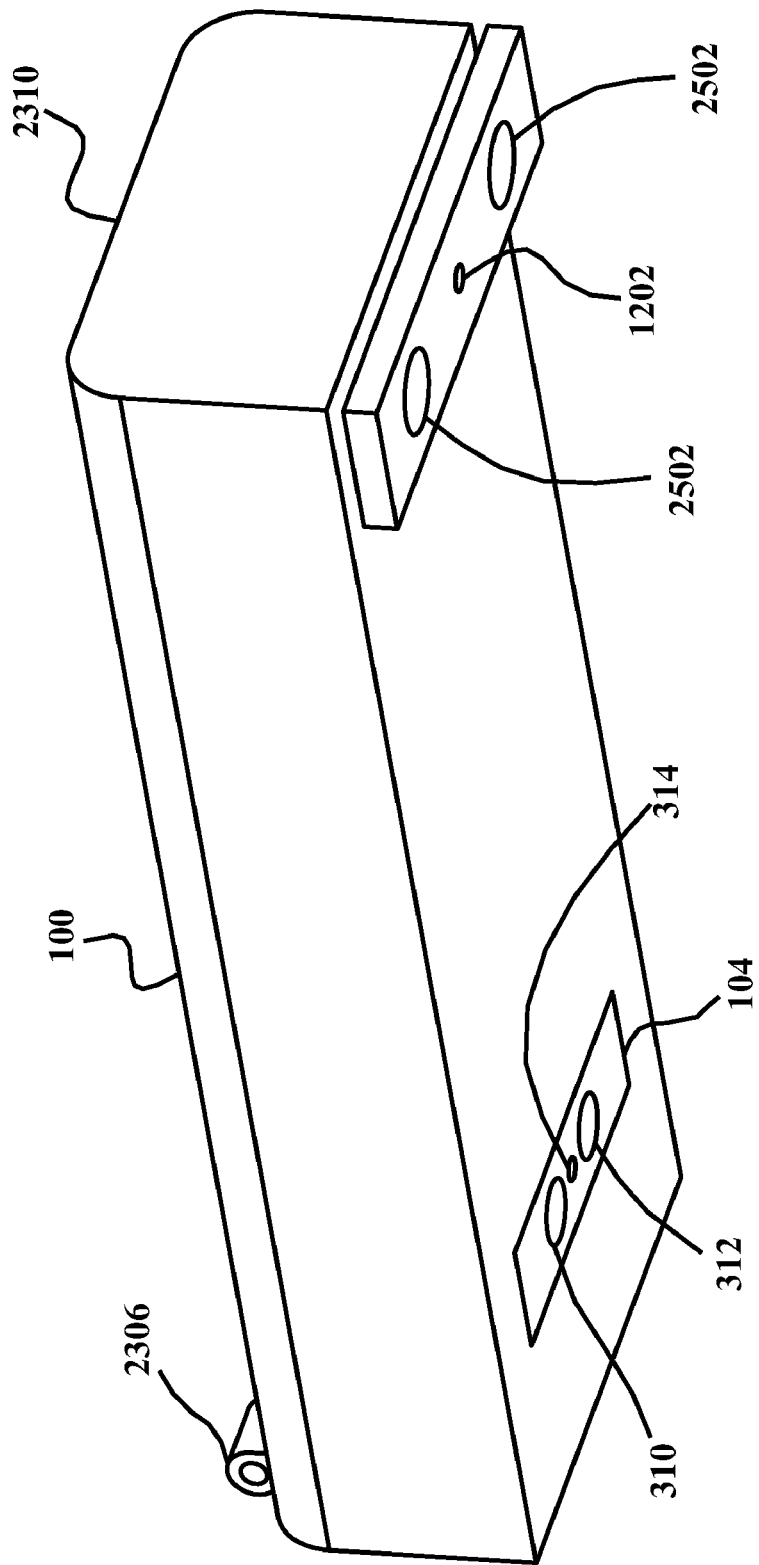
FIG. 25 is a perspective view of the security device of FIG. 23 having a coupling apparatus.
Figure 26:
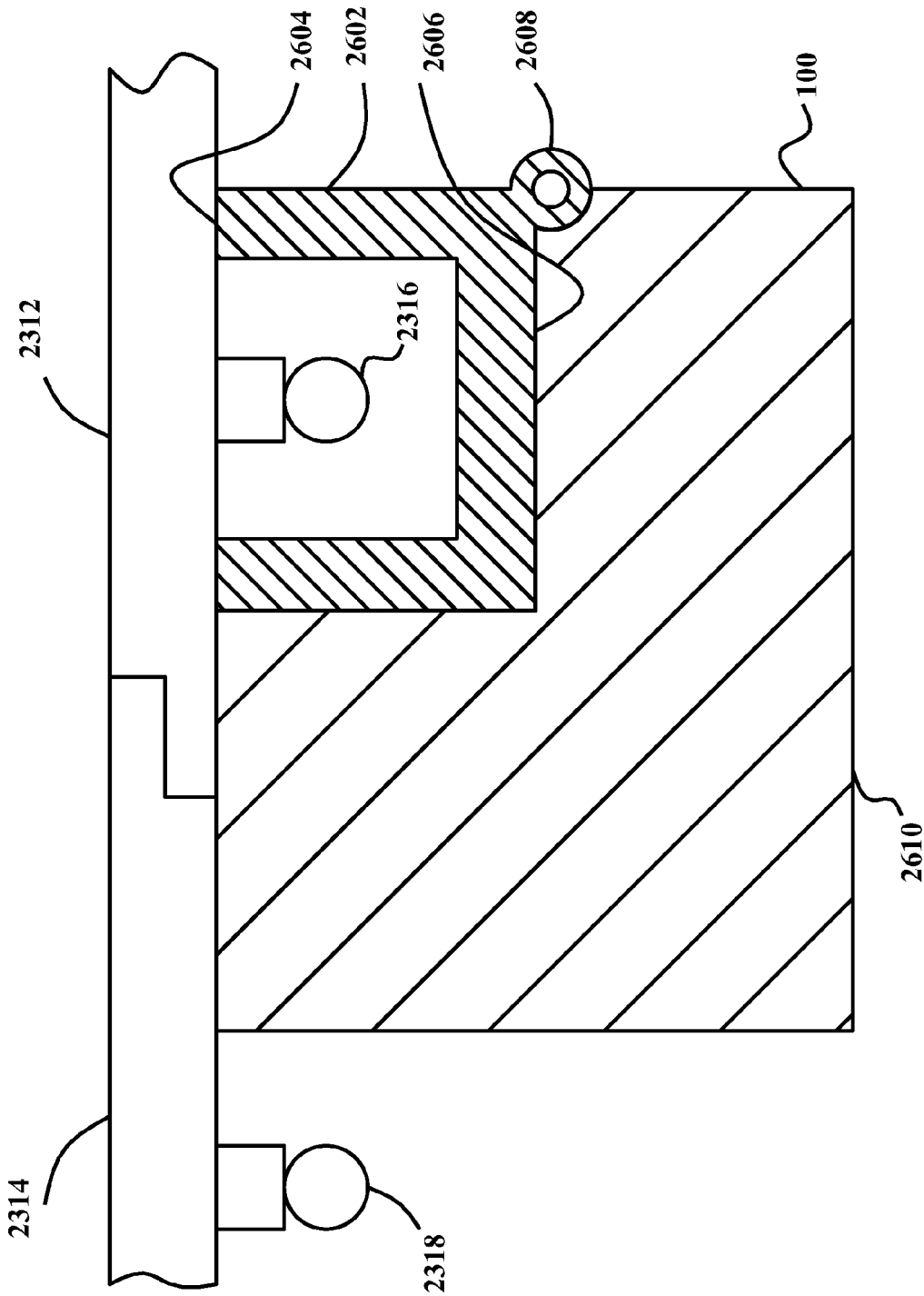
FIG. 26 is a plan view of the security device of FIG. 1 having an implementation of a coupling apparatus according to various aspects of the present invention.

Portal sensor 102 and/or removal detector 104 may be moveably coupled to security device 100. Moveably coupling portal sensor 102 and/or removal detector 104 to the body of security device 100 permits security device 100 to monitor portals having different closure mechanism, portal mounting mechanism, and portal spacing (e.g., gaps, misalignment). A moveable coupling may provide security device 100 greater uniformity in coupling to a portal and detecting portal status. In one implementation, portal sensor 102 moves along track 2112. Track 2112 permits portal sensor 102 to retract into body 2102 when portal cover 2110 is flush with portal casing 2106. Track 2112 permits portal sensor to extend from body 2102 when portal cover 2110 is not flush with portal casing 2106 as shown in FIG. 21. A moveable coupling may permit greater movement of a portal or security device 100 before providing a notice.

Security device 100 may couple to a portal cover, a portal casing, and/or a surface adjacent to a portal using a fastener. A fastener may be used in addition to or as a substitute to any couple force provided by removal detector 102. For example, fastener 2104 couples body 2102 of security device 100 to portal casing 2106. In an implementation where removal detector is of the type as removal detector 840, the removal detector provides additional magnetic coupling to a portal casing 2106 that is susceptible to magnetic coupling.

A portal that is not susceptible to magnetic coupling may be prepared for magnetic coupling using fasteners that are susceptible to magnetic coupling. For example, a fastener that is susceptible to magnetic coupling may be coupled to a portal cover. Coupling the fastener to the portal cover includes mechanical coupling and chemical coupling (e.g., glue). A fastener may be positioned on the portal cover to correspond to a position of a magnet in a removal detector. An implementation uses fastener 2206 coupled to right portal cover 2210 and positioned to correspond to the positions of magnets 2214 of removal detector 104. Fasteners 2206 mechanically couple to right portal cover 2210 and magnets 2214 magnetically couple to fasteners 2206 thereby coupling body 2202 of security device 100 to right portal cover 2210. Fasteners 2206 are positioned in such a manner that coupling body 2202 to the fasteners 206 positions portal sensor 102 proximate to left portal cover 2212.

Fasteners may also be used as conductors. A conductor may carry an electric potential. An electric potential may be impressed (e.g., provided) on a fastener by a first device and detected by a second device and/or alternately provided and detected by the first and second device. An electrical potential may carry information (e.g., signal). A fastener having an end portion exposed on each side of a portal cover may carry an electrical potential from one side of the portal through to the other side of the portal. An electric potential includes a direct current (e.g., DC) potential and an alternating potential (e.g., changing over time). In one implementation, fasteners 2206 conduct an electrical potential between access control 110 and device 2216 positioned in body 2204. Body 2204 is positioned on a different side of portal 2206 than body 2202. Device 2216 may include a security device, a portion of a security device, a communication module, and a concentrator. A fastener used as a conductor may need to be insulated from the material of the portal cover. For example, metal fasteners need to be insulated from a metal door to permit the fasteners to carry a signal. In one implementation, insulator 2208 insulates fastener 2206 from the material of right portal cover 2210.

Security device 100 may cooperate with a fastener to couple security device 100 to a portal cover and/or portal frame. Cooperation may include a coupling between the fastener and the portal and a coupling between the fastener and security device 100. A coupling between the fastener and security device 100 may permit portal sensor 102 of security device 100 to move between a sensing position to a non-sensing position without decoupling the fastener from the portal cover and/or frame. A coupling between the fastener and security device 100 may permit removal detector 104 to move between a removed position and a non-removed position without decoupling the fastener from the portal cover and/or frame. Movement from a non-removed position to a removed position magnetically decouples security device 100 from the fastener, but not the fastener from the portal. In one implementation, fastener 2302 includes base 2402 and a first portion 2304 of hinge 2308. Body 2310 of security device 100 includes a second portion 2306 of hinge 2308. Body 2310 pivotally moves with respect to fastener 2302 around hinge 2308.

Fastener 2302 includes first portion 2304 of hinge 2308, base 2402, and surface 2404. Base 2402 couples to right portal cover 2312. Coupling of base 2402 to right portal cover 2312 includes mechanical (e.g., fastener, welding), magnetic, and chemical (e.g., glue). When body 2310 of security device 100 is positioned in an operable position, surface 2404 is positioned adjacent to removal detector 102. Surface 2404 may be formed of a material that is susceptible to magnetic forces to cooperate with a magnetic implementation of removal detector 102. A magnetic implementation of removal detector 102 may magnetically couple to surface 2404 and detect removal of security device from surface 2404.

A security device 100 that cooperates with fastener 2302 includes second portion 2306 of hinge 2308, removal detector 104 that cooperates with surface 2404, and portal sensor 102 that is positioned adjacent to left portal cover 2314 when body 2310 of security device 100 is positioned in an operative position. Portal sensor 102 may include additional magnets 2502 to nominally couple portal sensor 102 to left portal cover 2314. Magnets 2502 may increase, decrease, or have no affect on a magnitude of the magnetic flux detected by sensor 1202. Magnets 2502 may increase a amount of force required to move left portal cover 2314 beyond a limit.

A shape of a fastener may cooperate with a portal to attach to any portion of a portal. For example, referring to FIG. 26, fastener 2602 couples to right portal cover 2312 over handle 2316. Body 2610 of security device 100 couples to fastener 2602 at hinge 2608 in such a manner that removal detector 102 (not shown) of security device 100 is positioned adjacent to surface 2606 and portal sensor 102 (not shown) is positioned adjacent to left portal cover 2314. Base 2604 couples to right portal cover 2312.

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A security device that detects removal of the device from a provided surface, the security device comprising:
 a body;
 at least one magnet coupled to the body; and
 a sensor coupled to the body proximate to at least one of the at least one magnet; wherein:
  the sensor does not move with respect to the at least one magnet;
  the at least one magnet provides a magnetic flux;
  magnetically coupling the at least one magnet to the surface conducts at least a portion of the magnetic flux away from the sensor; and
  decoupling the at least one magnet from the surface conducts at least a portion of the magnetic flux through the sensor thereby indicating removal of the body from the surface.

2. The security device of claim 1 wherein:
 the body comprises a metal plate; and
 at least two magnets magnetically couple to the plate.

3. The security device of claim 1 wherein:
 the sensor comprises a sensing axis; and
 the sensing axis is oriented perpendicular to an axis between a south pole and a north pole of at least one of the at least one magnet.

4. The security device of claim 1 wherein:
 the at least one magnet comprises a u-shaped magnet; and
 the sensor is positioned in a cavity of the u-shaped magnet between a north pole and a south pole.

5. The security device of claim 1 wherein:
 the at least one magnet comprises a magnet having a cavity; and
 the sensor is positioned in the cavity.

6. The security device of claim 1 wherein:
 the at least one magnet comprises a first magnet and a second magnet; and
 the sensor is positioned between the first magnet and the second magnet.

7. The security device of claim 6 wherein:
 the first magnet and the second magnet each have a north pole and a south pole;
 the north pole of the first magnet couples to the body; and
 the south pole of the second magnet couples to the body.

8. The security device of claim 7 wherein decoupling at least one of the first magnet and the second magnet from the surface conducts at least a portion of a magnetic flux between the south pole of the first magnet and the north pole of the second magnet through the sensor.

9. The security device of claim 7 wherein coupling at least one of the first magnet and the second magnet to the surface conducts at least a portion of the magnetic flux between the south pole of the first magnet and the north pole of the second magnet away from the sensor through the surface.

10. The security device of claim 1 wherein the sensor comprises a Hall effect sensor.

11. The security device of claim 1 wherein the sensor provides a signal when the flux conducted through the sensor is great than a threshold.

12. A removal detector that detects the removal of a provided security device from a provided surface, the detector comprising:
 at least one magnet; and
 a sensor positioned proximate to at least one of the at least one magnet; wherein:
  the at least one magnet couples to the security device;
  the sensor couples to the security device;
  the sensor does not move with respect to the at least one magnet;
  the at least one magnet provides a magnetic flux;
  magnetically coupling the at least one magnet to the surface conducts at least a portion of the magnetic flux away from the sensor; and
  decoupling the at least one magnet from the surface conducts at least a portion of the magnetic flux through the sensor thereby indicating removal of the security device from the surface.

13. The removal detector of claim 12 wherein:
 the sensor comprises a sensing axis; and the sensing axis is oriented perpendicular to an axis between a south pole and a north pole of at least one of the at least one magnet.

14. The removal detector of claim 12 wherein:
the at least one magnet comprises a u-shaped magnet; and
the sensor is positioned in the u-shaped magnet between a north pole and a south pole.

15. The removal detector of claim 12 wherein:
the at least one magnet comprises a magnet having a cavity; and
the sensor is positioned in the cavity.

16. The removal detector of claim 12 wherein:
the at least one magnet comprises a first magnet and a second magnet; and
the sensor is positioned between the first magnet and the second magnet.

17. The removal detector of claim 16 wherein:
the first magnet and the second magnet each having a north pole and a south pole;
the north pole of the first magnet couples to the security device; and
the south pole of the second magnet couples to the security device.

18. The removal detector of claim 17 wherein decoupling at least one of the first magnet and the second magnet from the surface conducts at least a portion of a magnetic flux between the south pole of the first magnet and the north pole of the second magnet through the sensor.

19. The removal detector of claim 17 wherein magnetically coupling at least one of the first magnet and the second magnet to the surface conducts a portion of the magnetic flux between the south pole of the first magnet and the north pole of the second magnet away from the sensor through the surface.

20. The removal detector of claim 12 wherein the sensor comprises a Hall effect sensor.

21. The removal detector of claim 12 wherein the sensor provides a signal when the flux conducted through the sensor is great than a threshold.

22. A security device that detects removal of the device from at least one of a first portal cover and a second portal cover, the security device comprising:
a body;
a first removal detector; and
a second removal detector; wherein:
the first removal detector magnetically couples the body to the first cover;
the second removal detector magnetically couples the body to the second cover;
the first removal detector detects removal of the body from the first cover;
the second removal detector detects removal of the body from the second cover;
at least one of the first removal detector and the second removal detector includes:
at least one magnet; and
a sensor positioned proximate to at least one of the at least one magnet; wherein:
the sensor does not move with respect to the at least one magnet;
each one magnet provides a magnetic flux;
magnetically coupling the at least one magnet to at least one of the first portal cover and the second portal cover conducts at least a portion of the magnetic flux away from the sensor; and
decoupling the at least one magnet from at least one of the first portal cover and the second portal cover conducts at least a portion of the magnetic flux through the sensor thereby indicating removal of the security device.

23. A method performed by a security device for detecting removal of the security device from a surface, the device having a body, the method comprising:
detecting a change in a magnitude of a magnetic flux through a sensor; and
providing a signal in accordance with detecting; wherein:
at least one magnet couples to the body of the security device;
the sensor couples to the body proximate to at least one magnet of the at least one magnet;
the sensor does not move with respect to the at least one magnet;
each at least one magnet provides a magnetic flux;
magnetically coupling the at least one magnet to the surface conducts at least a portion of the magnetic flux away from the sensor; and
decoupling the at least one magnet from the surface conducts at least a portion of the magnetic flux through the sensor thereby indicating removal of the security device.

24. The method of claim 23 wherein detecting comprises:
detecting successive magnitudes of the magnetic flux; and
comparing successive magnitudes.

25. The method of claim 23 wherein detecting comprises applying a hysteresis to the change in the magnitude of the magnetic flux.

26. The method of claim 23 wherein detecting comprises detecting a change greater than a threshold.

27. A removal detector that detects the removal of a provided security device from a provided surface, the detector comprising:
at least one magnet; and
a sensor positioned proximate to at least one of the at least one magnet; wherein:
the at least one magnet couples to the security device;
the sensor couples to the security device;
the sensor and the at least one magnet do not move with respect to each other;
the at least one magnet provides a magnetic flux;
magnetically coupling the at least one magnet to the surface conducts at least a portion of the magnetic flux through the surface away from the sensor; and decoupling the at least one magnet from the surface conducts at least a portion of the magnetic flux through the sensor thereby indicating removal of the security device.

* * * * *